(12) United States Patent
Lu et al.

(10) Patent No.: US 11,429,852 B2
(45) Date of Patent: Aug. 30, 2022

(54) CONVOLUTION ACCELERATION AND COMPUTING PROCESSING METHOD AND APPARATUS, ELECTRONIC DEVICE, AND STORAGE MEDIUM

(71) Applicant: BEIJING SENSETIME TECHNOLOGY DEVELOPMENT CO., LTD., Beijing (CN)

(72) Inventors: Liqiang Lu, Beijing (CN); Yun Liang, Beijing (CN); Qingcheng Xiao, Beijing (CN); Shengen Yan, Beijing (CN)

(73) Assignee: BEIJING SENSETIME TECHNOLOGY DEVELOPMENT CO., LTD., Beijing (CN)

( * ) Notice: Subject to any disclaimer, the term of this patent is extended or adjusted under 35 U.S.C. 154(b) by 371 days.

(21) Appl. No.: 16/662,493

(22) Filed: Oct. 24, 2019

(65) Prior Publication Data
US 2020/0057938 A1 Feb. 20, 2020

Related U.S. Application Data

(63) Continuation of application No. PCT/CN2018/084948, filed on Apr. 27, 2018.

(30) Foreign Application Priority Data

Apr. 28, 2017 (CN) .................. 201710300171.X

(51) Int. Cl.
*G06N 3/063* (2006.01)
*G06F 9/50* (2006.01)
(Continued)

(52) U.S. Cl.
CPC ............ *G06N 3/063* (2013.01); *G06F 9/5027* (2013.01); *G06F 9/544* (2013.01); *G06F 17/16* (2013.01)

(58) Field of Classification Search
CPC ....... G06N 3/063; G06F 9/5027; G06F 9/544; G06F 17/16
See application file for complete search history.

(56) References Cited

U.S. PATENT DOCUMENTS

2013/0142030 A1   6/2013 Parnaby et al.
2018/0046900 A1*  2/2018 Dally .................. G06N 3/0427

FOREIGN PATENT DOCUMENTS

CN    102339386 A   2/2012
CN    105869117 A   8/2016
(Continued)

OTHER PUBLICATIONS

Liu Qi,etc.,"Accelerating Convolution Based Detection Model On GPU", Information Technology Series, 2014(12).
(Continued)

*Primary Examiner* — Michael D. Yaary
(74) *Attorney, Agent, or Firm* — Syncoda LLC; Feng Ma

(57) ABSTRACT

A convolution acceleration and computing processing method includes: reading data to be processed of a preset size in a task to be processed from an off-chip memory of an accelerator sequentially through a FIFO port, and storing the data to be processed into at least one input buffer of a first buffer in an on-chip memory of the accelerator; responsive to data to be processed being stored into an input buffer, reading input window data to be processed from the at least one input buffer sequentially, performing convolution on the input window data to be processed by using the convolution kernel data to obtain output window data and storing the output window data in the third buffer; and storing the output window data in the third buffer into the off-chip memory sequentially through the FIFO port.

19 Claims, 13 Drawing Sheets

Read data to be processed of a preset size in a task to be processed from an off-chip memory of an accelerator sequentially through a First Input First Output port, and store the data to be processed into input buffers of a first buffer; and in response to data to be processed being stored into a first input buffer, read input window data to be processed from the input buffers sequentially, perform convolution on the input window data to be processed by using convolution kernel data to obtain output window data, and store the output window data in a third buffer ⟶ 102

Store the output window data in the third buffer into the off-chip memory sequentially through the FIFO port ⟶ 104

(51) Int. Cl.
  *G06F 9/54* (2006.01)
  *G06F 17/16* (2006.01)

(56) References Cited

FOREIGN PATENT DOCUMENTS

| CN | 105956660 A | 9/2016 |
|---|---|---|
| CN | 106228240 A | 12/2016 |
| CN | 106547885 A | 3/2017 |

OTHER PUBLICATIONS

Notice of Allowance of the Chinese application No. 201710300171.X, dated Jul. 6, 2021.
Yufei Ma et al. "Optimizing Loop Operation and Dataflow in FPGA Acceleration of Deep Convolutional Neural Networks"; FPGA 17 Proceedings of the 2017 ACM/SIGDA International Symposium on Field-Programmable Gate Arrays, Feb. 24, 2017, pp. 45-54.
Hyunsun Park et al. "Zero and data reuse-aware fast convolution for deep neural networks on GPU"; 2016 International Conference on Hardware/Software Codesign and System Synthesis (CODES+ISSS), Nov. 24, 2016, pp. 1-10.
International Search Report in the international application No. PCT/CN2018/084948, dated Jul. 31, 2018.
English translation of the Written Opinion of the International Search Authority in the international application No. PCT/CN2018/084948, dated Jul. 31, 2018.
Liqiang Lu et al. "Evaluating Fast Algorithms for Convolutional Neural Networks on FPGAs"; 2017 IEEE 25th Annual International Symposium on Fied-Programmable Custom Computing Machines; 2017.
Chen Z. et al., Optimizing FPGA-based Accelerator Design for Deep Convolutional Neural Networks. Proceedings of the 2015 ACM/SIGDA International Symposium on Field-Programmable Gate Arrays, May 24, 2015, pp. 161-170Figure 1,11, Sections 3.1, 4.1, 4.3, 6.
Li H. et al., A high performance FPGA-based accelerator for large-scale convolutional neural networks. 26th International Conference on Field Programmable Logic and Applications (FPL), Sep. 2, 2016, pp. 1-9Figs. 4-5,12, Abstract, Sections I, IV.
Zhao R., Optimizing CNN-based Object Detection Algorithms on Embedded FPGA Platforms. International Symposium on Applied Reconfigurable Computing ARC 2017, Mar. 31, 2017, pp. 255-267 Figs. 1-2, Sections 2-5.
Qiu J. et al., Going Deeper with Embedded FPGA Platform for Convolutional Neural Network. Proceedings of the 2016 ACM/SIGDA International Symposium on Field-Programmable Gate Arrays, Feb. 23, 2016, pp. 26-35 Figures 4, 7, Sections 4, 6.1, 6.2, 6.3, 8.1.
Zhang J. et al., Improving the Performance of OpenCL-based FPGA Accelerator for Convolutional Neural Network. Proceedings of the 2017ACM/SIGDA International Symposium on Field-Programmable Gate Arrays, Feb. 24, 2017, pp. 25-34 Figure 5-6, 8, Abstract, Section 4.1, 5, 5.2.1.
Written Opinion of the Singaporean application No. 11201910024P, dated May 16, 2020.

* cited by examiner

CONVOLUTION ACCELERATION AND COMPUTING PROCESSING METHOD AND APPARATUS, ELECTRONIC DEVICE, AND STORAGE MEDIUM

CROSS-REFERENCE TO RELATED APPLICATIONS

This is a continuation of International Patent Application No. PCT/CN2018/084948 filed on Apr. 27, 2018, which claims priority to Chinese Patent Application No. CN201710300171.X, filed on Apr. 28, 2017. The contents of these applications are incorporated herein by reference in their entirety.

BACKGROUND

As an information processing technology that simulates biological neural structures, neural networks have developed rapidly in recent years. Neural networks have very powerful nonlinear mapping capabilities. Deep Convolutional Neural Network (CNN) has shown significant performance in various computer vision tasks such as image classification, object detection, and semantic segmentation.

Due to the need to process a feature map of a region in an image, the computing accuracy of the CNN is increased, and the computing complexity is also multiplied. For the huge computing pressure, a Graphics Processing Unit (GPU), a Field Programmable Gate Array (FPGA), an Application Specific Integrated Circuit (ASIC), and other hardware accelerators are used to accelerate the computing process of the CNN. In existing accelerators, an FPGA is an efficient accelerator in an embedded platform, and has the characteristics of reconfigurability, parallel computing, short development cycle, low power consumption, and high flexibility. In recent years, the technology of accelerating a CNN by using an FPGA has been rapidly developed.

SUMMARY

The present disclosure relates to computer vision technologies, and in particular, to a convolution acceleration and computing processing method and apparatus, an electronic device, and a non-transitory storage medium.

Embodiments of the present disclosure provide technical solutions for accelerating a CNN by using an FPGA, including: convolution acceleration methods and accelerators, convolution processing methods and apparatuses, electronic devices, and computer storage media.

A convolution acceleration method provided according to one aspect of the embodiments of the present disclosure includes: reading data to be processed of a preset size in a task to be processed from an off-chip memory of an accelerator sequentially through a First Input First Output (FIFO) port, and storing the data to be processed into at least one input buffer of a first buffer in an on-chip memory of the accelerator, where the on-chip memory includes a first buffer, a second buffer, and a third buffer, the first buffer includes at least one input buffer, and at least one set of convolution kernel data is buffered in the second buffer; in response to data to be processed being stored into an input buffer, reading input window data to be processed from the at least one input buffer sequentially and performing convolution on the input window data to be processed by using the convolution kernel data to obtain output window data and storing the output window data in the third buffer; and storing the output window data in the third buffer into the off-chip memory sequentially through the FIFO port.

A convolution processing method provided according to another aspect of the embodiments of the present disclosure includes: converting input window data to be processed through a second constant matrix to obtain converted input window data; performing a matrix dot product operation on the converted input window data and convolution kernel data to obtain a matrix subjected to dot product, where the convolution kernel data is obtained by converting a convolution kernel through a first constant matrix; and converting the matrix subjected to dot product through a third constant matrix to obtain a convolution result.

A convolution accelerator provided according to yet another aspect of the embodiments of the present disclosure includes: a processor; a memory for storing instructions executable by the processor; a first buffer comprising at least one input buffer and configured to buffer the data to be processed; a second buffer, configured to buffer at least one set of convolution kernel data; and a third buffer, comprising at least one output buffer and configured to buffer the output window data. The processor is configured to: read sequentially, through a First Input First Output (FIFO) port, data to be processed of a preset size in a task to be processed from an off-chip memory of the accelerator, and store the data to be processed into at least one input buffer of the first buffer; read input window data to be processed from the at least one input buffer sequentially when data to be processed is stored into an input buffer, perform convolution on the input window data to be processed by using the convolution kernel data to obtain output window data and store the output window data in the third buffer; and store the output window data in the third buffer into the off-chip memory sequentially through the FIFO port.

A convolution accelerator provided according to yet another aspect of the embodiments of the present disclosure includes: a data reading module, configured to read data to be processed of a preset size in a task to be processed from an off-chip memory of the accelerator sequentially through a FIFO port, and store the data to be processed into at least one input buffer of a first buffer; the first buffer, including at least one input buffer and configured to buffer the data to be processed; a second buffer, configured to buffer at least one set of convolution kernel data; a computing module, configured to read input window data to be processed from the at least one input buffer sequentially when data to be processed is stored into an input buffer, perform convolution on the input window data to be processed by using the convolution kernel data, and obtain output window data and store the output window data in the third buffer; a third buffer, including at least one output buffer and configured to buffer the output window data; and a data output module, configured to store the output window data in the third buffer into the off-chip memory sequentially through the FIFO port.

A convolution processing apparatus provided according to yet another aspect of the embodiments of the present disclosure includes: a first conversion module, configured to convert input window data to be processed through a second constant matrix to obtain converted input window data; a dot product module, configured to perform a matrix dot product operation on the converted input window data and convolution kernel data to obtain a matrix subjected to dot product, where the convolution kernel data is obtained by converting a convolution kernel through a first constant matrix; and a second conversion module, configured to convert the matrix subjected to dot product through a third constant matrix to obtain a convolution result.

An electronic device provided according to yet another aspect of the embodiments of the present disclosure includes the convolution accelerator or the convolution processing apparatus according to any one of the embodiments of the present disclosure.

Another electronic device provided according to yet another aspect of the embodiments of the present disclosure includes: a memory, configured to store executable instructions; and a processor, configured to communicate with the memory to execute the executable instructions so as to complete the operations of the convolution acceleration method according to any of the embodiments of the present disclosure.

A non-transitory computer storage medium provided according to yet another aspect of the embodiments of the present disclosure is used for storing computer-readable instructions, where the instructions, when being executed by a processor, cause the processor to execute the operations of the convolution acceleration method or convolution processing method according to any of the embodiments of the present disclosure are executed.

According to the convolution acceleration methods and accelerators and the corresponding electronic devices and computer storage media provided in the above embodiments of the present disclosure, the on-chip memory of the accelerator includes a first buffer, a second buffer, and a third buffer, the first buffer includes at least one input buffer, and at least one set of convolution kernel data is buffered in the second buffer. Data to be processed of a preset size in a task to be processed is read from an off-chip memory of an accelerator sequentially through a FIFO port, and is stored into at least one input buffer of a first buffer in an on-chip memory of the accelerator; in response to data to be processed being stored into an input buffer, input window data to be processed is read from the at least one input buffer sequentially, convolution is performed on the input window data to be processed by using convolution kernel data, and output window data is obtained and stored in a third buffer; and then the output window data in the third buffer is stored into the off-chip memory sequentially through the FIFO port. According to the embodiments of the present disclosure, data to be processed of a preset size in a task to be processed is read from an off-chip memory of an accelerator and stored into the on-chip memory for processing each time, and pipeline processing for procedures such as reading data to be processed from the off-chip memory and storing it on the on-chip memory, and performing convolution processing on the data to be processed is implemented. The embodiments of the present disclosure can make full use of the on-chip memory of the accelerator and bandwidth, Digital Signal Processor (DSP) and other resources, significantly improve the efficiency of convolution processing, and may be applied to a hardware platform such as an FPGA and an ASIC, thereby implementing convolution acceleration processing on the hardware platform such as an FPGA and an ASIC. When the embodiments of the present disclosure are applied to an FPGA platform, the advantages of reconfigurability, parallel computing, short development cycle, low power consumption, and high flexibility of the FPGA platform may be fully utilized.

According to the convolution processing methods and apparatuses and the corresponding electronic devices and computer storage media provided in the above embodiments of the present disclosure, for any input channel and any output channel, input window data to be processed may be converted through a second constant matrix to obtain converted input window data; a matrix dot product operation is performed on the converted input window data and convolution kernel data to obtain a matrix subjected to dot product; and the matrix subjected to dot product is converted through a third constant matrix to obtain a convolution result. The embodiments of the present disclosure provide a method for performing surface-to-surface convolution on input window data based on a Winograd algorithm. Compared with a conventional point-to-point convolution algorithm, the number of multiplications is reduced, and thus, the occupation of processor resources is reduced and the computing efficiency is improved. The embodiments of the present disclosure may be applied to a hardware platform such as an FPGA and an ASIC, thereby implementing convolution acceleration processing on the hardware platform such as an FPGA and an ASIC. When the embodiments of the present disclosure are applied to an FPGA platform, the advantages of reconfigurability, parallel computing, short development cycle, low power consumption, and high flexibility of the FPGA platform may be fully utilized.

The following further describes in detail the technical solutions of the present disclosure with reference to the accompanying drawings and embodiments.

BRIEF DESCRIPTION OF DRAWINGS

The accompanying drawings constituting a part of the specification describe the embodiments of the present disclosure and are intended to explain the principles of the present disclosure together with the descriptions.

According to the following detailed descriptions, the present disclosure may be understood more clearly with reference to the accompanying drawings.

DETAILED DESCRIPTION

Figure 1:
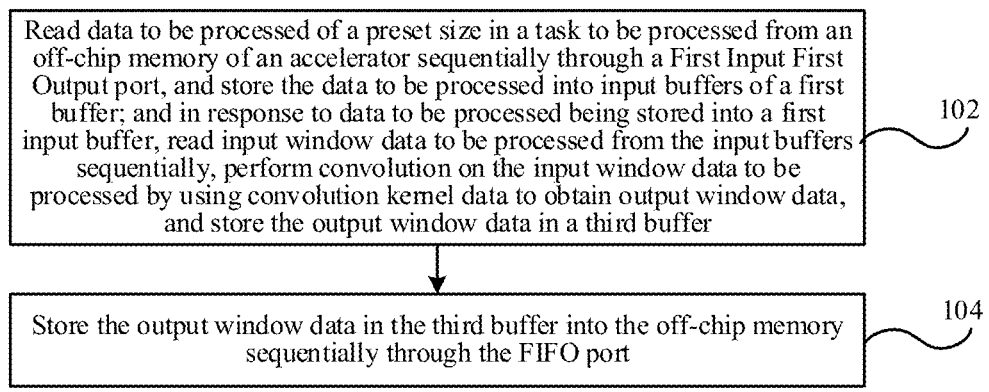
FIG. 1 is a flowchart of an embodiment of a convolution acceleration method according to the present disclosure.

Various exemplary embodiments of the present disclosure are now described in detail with reference to the accompanying drawings. It should be noted that, unless otherwise stated specifically, relative arrangement of the components and steps, the numerical expressions, and the values set forth in the embodiments are not intended to limit the scope of the present disclosure.

In addition, it should be understood that, for ease of description, the size of each part shown in the accompanying drawings is not drawn in actual proportion.

The following descriptions of at least one exemplary embodiment are merely illustrative actually, and are not intended to limit the present disclosure and the applications or uses thereof.

Technologies, methods and devices known to a person of ordinary skill in the related art may not be discussed in detail, but such technologies, methods and devices should be considered as a part of the specification in appropriate situations.

It should be noted that similar reference numerals and letters in the following accompanying drawings represent similar items. Therefore, once an item is defined in an accompanying drawing, the item does not need to be further discussed in the subsequent accompanying drawings.

The embodiments of the present disclosure may be applied to electronic devices such as terminal devices, computer systems, and servers, which may operate with numerous other general-purpose or special-purpose computing system environments or configurations. Examples of well-known terminal devices, computing systems, environments, and/or configurations suitable for use together with the electronic devices such as terminal devices, computer systems, and servers include, but are not limited to, personal computer systems, server computer systems, thin clients, thick clients, handheld or laptop devices, microprocessor-based systems, set top boxes, programmable consumer electronics, network personal computers, small computer systems, large computer systems, distributed cloud computing environments that include any one of the foregoing systems, and the like.

The electronic devices such as terminal devices, computer systems, and servers may be described in the general context of computer system executable instructions (for example, program modules) executed by the computer system. Generally, the program modules may include routines, programs, target programs, components, logics, data structures, and the like for performing specific tasks or implementing specific abstract data types. The computer system/server may be practiced in the distributed cloud computing environments in which tasks are performed by remote processing devices that are linked through a communications network. In the distributed computing environments, the program modules may be located in local or remote computing system storage media including storage devices.

FIG. 1 is a flowchart of an embodiment of a convolution acceleration method according to the present disclosure. As shown in FIG. 1, the convolution acceleration method according to the embodiments of the present disclosure includes the following operations.

At block 102, data to be processed of a preset size in a task to be processed is read from an off-chip memory of an accelerator sequentially through a FIFO port, and is stored into at least one input buffer of a first buffer in an on-chip memory of the accelerator; and in response to data to be processed being stored into an input buffer, input window data to be processed is read from the at least one input buffer sequentially, convolution is performed on the input window data to be processed by using convolution kernel data, and output window data is obtained and stored in a third buffer.

The on-chip memory includes a first buffer, a second buffer, and the third buffer, the first buffer includes at least one input buffer, and at least one set of convolution kernel data is buffered in the second buffer.

The convolution acceleration method according to the embodiments of the present disclosure may be applied to any accelerator, particularly an embedded platform such as an FPGA or an ASIC with relatively small on-chip memory and bandwidth resources.

In the embodiments of the present disclosure, the task to be processed may include, for example, an input image of at least one channel or an input feature map of at least one channel, and after processing the task to be processed is completed, an output feature map of the at least one channel may be obtained. In order to facilitate distinguishing of channels for an input image, an input feature map, and an output feature map, in the embodiments of the present disclosure, channels for an input image and an input feature map are referred to as input channels, and a channel for an output feature map is referred to as an output channel. Each grayscale of an input image and an input feature map corresponds to one channel. For example, an input image or an input feature map of each of three colors, i.e., Red, Green, and Blue (RGB), corresponds to one channel, and an input image or an input feature map including the three colors of RGB has three input channels. In addition, each set of convolution kernel data corresponds to one output channel respectively, each set of convolution kernel data includes at least one piece of convolution kernel data, and each piece of convolution kernel data corresponds to one input channel respectively.

In an optional example, the operations in block 102 may be executed by a processor by invoking a corresponding instruction stored in a memory, or may be executed by a data reading module and a computing module run by the processor.

At block 104, the output window data in the third buffer is stored into the off-chip memory sequentially through the FIFO port.

According to the convolution acceleration method provided in the foregoing embodiment of the present disclosure, the on-chip memory of the accelerator includes a first buffer, a second buffer, and a third buffer, the first buffer includes at least one input buffer, and at least one set of convolution kernel data is buffered in the second buffer. Data to be processed of a preset size in a task to be processed is read from an off-chip memory of an accelerator sequentially through a FIFO port, and is stored into at least one input buffer of a first buffer in an on-chip memory of the accelerator; in response to data to be processed being stored into an input buffer, input window data to be processed is read from the at least one input buffer sequentially, convolution is performed on the input window data to be processed by using convolution kernel data, and output window data is obtained and stored in a third buffer; and then the output window data in the third buffer is stored into the off-chip memory sequentially through the FIFO port. According to the embodiments of the present disclosure, data to be processed of a preset size in a task to be processed is read from an off-chip memory of an accelerator and stored into the on-chip memory for processing each time, and pipeline processing for procedures such as reading data to be processed from the off-chip memory and storing it on the on-chip memory, and performing convolution processing on the data to be processed is implemented. The embodiments of the present disclosure can make full use of the on-chip memory of the accelerator and bandwidth, DSP and other resources, significantly improve the efficiency of convolution processing, and may be applied to a hardware platform such as an FPGA and an ASIC, thereby implementing convolution acceleration processing on the hardware platform such as an FPGA and an ASIC. When the embodiments of the present disclosure are applied to an FPGA platform, the advantages of reconfigurability, parallel computing, short development cycle, low power consumption, and high flexibility of the FPGA platform may be fully utilized.

In an optional example, the operation in block 104 may be executed by a processor by invoking a corresponding instruction stored in a memory, or may be executed by a data output module run by the processor.

In an optional example of the embodiment shown in FIG. 1, the first buffer includes two input buffers. During processing the task to be processed, storage of data to be processed and reading of input window data to be processed are performed on one of the two input buffers alternately, and reading of input window data to be processed and storage of data to be processed are performed on the other of the two input buffers alternately. When data to be processed is stored in one of the two input buffers, input window data to be processed is read from the other of the two input buffers, and when input window data to be processed is read from the former, data to be processed is stored in the other. Thus, pipeline processing for storage of data to be processed and reading of input window data to be processed is implemented, the time required to store data to be processed and the time required to read input window data to be processed overlap each other, the time required for the entire acceleration process is reduced, and the acceleration efficiency of the CNN is improved.

In the embodiments of the present disclosure, the size of a convolution kernel corresponding to the convolution kernel data is represented as r×r, the size of an input window corresponding to the input window data is represented as n×n, the sliding step of the input window corresponding to the input window data is represented as m, and the size of an output window corresponding to the input window data is represented as m×m. The values of r, m, and n are respectively integers greater than 0 and satisfy the condition that n=m+r−1. Thus, the value of m is less than or equal to the value of n. When the value of r is greater than 1, the value of m is less than the value of n. When the value of r is 1, the value of m is equal to the value of n.

Figure 2:
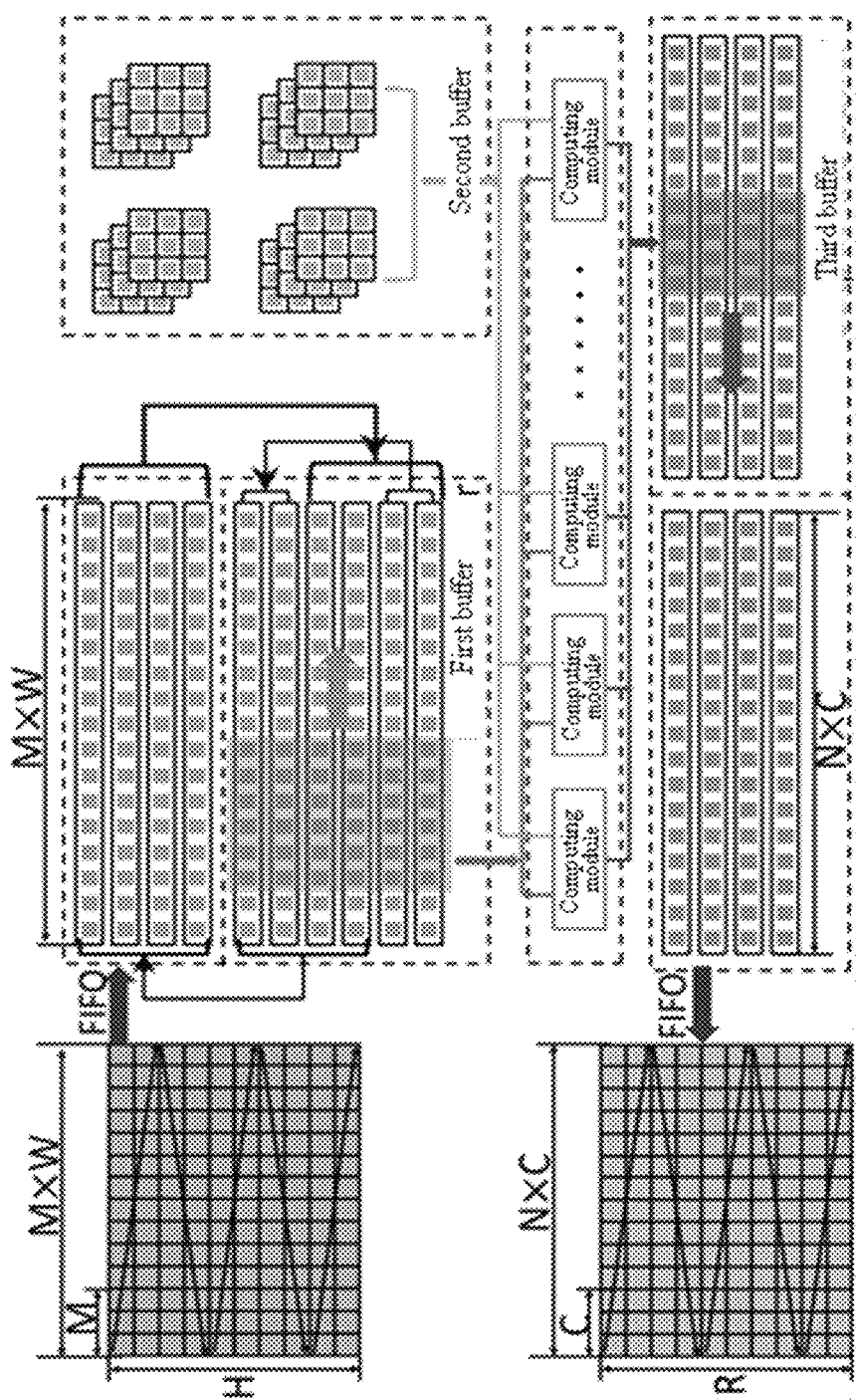
FIG. 2 is a diagram showing an example of an on-chip memory in embodiments of the present disclosure.

In another optional example of the embodiment shown in FIG. 1, the input buffer is a line buffer; the first buffer is a cyclic buffer formed by n+m line buffers, and each of the line buffers is used for storing sequentially data in the same row in all channels of the task to be processed. FIG. 2 is a diagram showing an example of an on-chip memory in embodiments of the present disclosure. M represents the number of channels of an input feature map, i.e., the number of input channels, H represents the height of the input feature map, W represents the width of the input feature map, M×W represents the size of the input feature map, the computing module represents a unit for performing convolution on input window data in the first buffer, C represents the number of channels of an output feature map, i.e., the number of output channels, R represents the height of the output feature map, N represents the width of the output feature map, and N×C represents the size of the input feature map.

Accordingly, in another optional example, the reading data to be processed of a preset size in a task to be processed from an off-chip memory of an accelerator and storing sequentially the data to be processed into at least one input buffer of a first buffer in an on-chip memory of the accelerator includes the following steps:

the first n rows of data in all channels of the task to be processed is read from the off-chip memory for the first time, and the first n rows of data are stored correspondingly into the first n line buffers determined according to a predetermined cyclic direction in the first buffer; and then m adjacent subsequent rows of data in all channels of the task to be processed is read from the off-chip memory each time, and the m rows of data read this time are stored correspondingly into m adjacent subsequent line buffers determined according to the predetermined cyclic direction in the first buffer.

Thus, when the value of r is 1, the value of m is equal to the value of n. In this case, m (=n) rows of data of all channels of the task to be processed are read from the off-chip memory each time, and are adjacently stored into m line buffers in the first buffer without overlapping data read last time.

When the value of r is greater than 1, the value of m is less than the value of n. In this case, the number m of rows for reading, not for the first time, data of the task to be processed from the off-chip memory is less than the number n of rows of data read for the first time, and the data read not for the first time may be adjacently stored into m line buffers in the first buffer without overlapping data read last time; it is also possible to read n adjacent subsequent rows of data in all channels of the task to be processed from the off-chip memory each time and store the data into n line buffers determined according to a predetermined cyclic direction in the first buffer, the n line buffers where data is stored not for the first time include the last r−1 line buffers buffering data last time and m adjacent subsequent line buffers, and in this case, overlapping and overwriting of data may occur to the above r−1 line buffers. With respect to the solution that each time n rows of data are read from the off-chip memory and stored in the first buffer, the solution of reading, not for the first time, m rows of data from the off-chip memory each time and storing the data into the first buffer may reduce the amount of data transmission, thereby reducing transmission bandwidths and improving data reading, transmission, and storage efficiency.

For example, when n=6, m=4, and r=3, the first 6 rows of data in all channels of the task to be processed may be read from the off-chip memory for the first time and stored into the first n line buffers determined according to a predetermined cyclic direction in the first buffer. Subsequently, 4 adjacent subsequent rows of data in all channels of the task to be processed are read from the off-chip memory each time, and the 4 rows of data read this time are correspondingly stored into 4 adjacent subsequent line buffers determined according to a predetermined cyclic direction in the first buffer; or it is also possible to read 6 adjacent subsequent rows of data in all channels of the task to be processed from the off-chip memory each time subsequently, and store the 6 rows of data read this time into 6 line buffers determined according to a predetermined cyclic direction in the first buffer from 4 adjacent subsequent line buffers and the last 2 line buffers storing data last time.

Or, in yet another optional example, the reading data to be processed of a preset size in a task to be processed from an off-chip memory of an accelerator and storing sequentially the data to be processed into at least one input buffer of a first buffer in an on-chip memory of the accelerator includes the following steps:

n rows of data in all channels of the task to be processed are read from the off-chip memory each time;

for the first n rows of data read from the task to be processed for the first time, the first n rows of data are stored correspondingly into the first n line buffers determined according to a predetermined cyclic direction in the first buffer; and for n rows of data that are read not for the first time, n corresponding line buffers are taken as target line buffers for the n rows of data read this time, where the n corresponding line buffers are obtained by sliding the first n line buffers, which store n rows of data read last time, by m rows according to the predetermined cyclic direction in the first buffer, and the n rows of data read this time are stored into the target line buffers correspondingly.

In the yet another optional example, when n rows of data read not for the first time are stored into the first buffer, data in the last n-m line buffers of n line buffers, storing data last time, in the first buffer is overwritten. Corresponding to the another optional example and yet another optional example described above, the reading input window data to be processed from the at least one input buffer sequentially and performing convolution on the input window data to be processed by using the convolution kernel data includes the following steps:

for the task to be processed, when input window data to be processed is read for the first time, the first n line buffers are selected as a current computing buffer, input window data with a size of n×n is read from the current computing buffer sequentially according to the sliding step m, and convolution is performed on the input window data to be processed by using the convolution kernel data, until all data to be processed in the current computing buffer is read; and then n line buffers are selected as a new computing buffer via sliding from the previous computing buffer according to the sliding step m and the predetermined cyclic direction each time, input window data with a size of n×n is read from the new computing buffer sequentially according to the sliding step m, and convolution is performed on the input window data to be processed by using the convolution kernel data, until all data to be processed in the new computing buffer is read.

In addition, in the above embodiments of the convolution acceleration methods according to the present disclosure, the third buffer includes at least one output buffer; then when obtaining output window data and storing the output window data in the third buffer, the output window data is obtained and stored into the at least one output buffer sequentially; accordingly, the operation in block 104 includes: in response to output window data being stored in the first output buffer, reading output window data in the at least one output buffer sequentially, and storing the read output window data into the off-chip memory through the FIFO port.

According to one or more embodiment of the present disclosure, the third buffer may include two output buffers. During processing the task to be processed, storage of output window data and reading of output window data are performed on one of the two output buffers alternately, and reading of output window data and storage of output window data are performed on the other of the two output buffers alternately. When output window data is stored into one of the two output buffers, output window data is read from the other of the two output buffers, and when output window data is read from the former, output window data is stored into the other. Thus, pipeline processing for storage of output window data and reading of output window data is implemented, the time required to store output window data and the time required to read output window data overlap each other, the time required for the entire acceleration process is further reduced, and the working efficiency of the accelerator is improved.

According to one or more embodiment of the present disclosure, each output buffer may include m line buffers. Accordingly, in the above embodiments, the obtaining the output window data and storing the output window data in the at least one output buffer sequentially includes the following steps:

one of the output buffers is selected as a current output buffer, and output window data obtained by performing convolution on each piece of input window data is stored in the m line buffers of the current output buffer sequentially; and in response to storage of output window data obtained by performing convolution on all input window data in one computing buffer being completed, another output buffer is selected as a current output buffer, and the operation of storing sequentially output window data, obtained by performing convolution on each piece of input window data, in the m line buffers of the current output buffer is performed.

The storing the output window data in the third buffer into the off-chip memory sequentially includes the following step:

in response to storage of output window data obtained by performing convolution on all input window data in the current computing buffer being completed, the output window data in the current output buffer is stored into the off-chip memory.

In addition, in still another optional example of the embodiment shown in FIG. 1, the input buffer is a column buffer; the first buffer is a cyclic buffer formed by n+m column buffers, and each of the column buffers is used for storing sequentially data in the same column in all channels of the task to be processed.

Accordingly, in the still another optional example, the reading data to be processed of a preset size in a task to be processed from an off-chip memory of an accelerator and storing sequentially the data to be processed into at least one input buffer of a first buffer in an on-chip memory of the accelerator includes the following steps:

The first n columns of data in all channels of the task to be processed is read from the off-chip memory for the first time, and the first n columns of data are stored correspondingly into the first n column buffers determined according to a predetermined cyclic direction in the first buffer; and then m adjacent subsequent columns of data in all channels of the task to be processed is read from the off-chip memory each time, and the m columns of data read this time are stored correspondingly into m adjacent subsequent column buffers determined according to the predetermined cyclic direction in the first buffer.

Or, in next optional example, the reading data to be processed of a preset size in a task to be processed from an off-chip memory of an accelerator and storing sequentially the data to be processed into at least one input buffer of a first buffer in an on-chip memory of the accelerator includes the following steps:

n columns of data in all channels of the task to be processed are read from the off-chip memory each time;

for the first n columns of data read from the task to be processed for the first time, the first n columns of data are stored correspondingly into the first n column buffers determined according to a predetermined cyclic direction in the first buffer; and for n columns of data that are read not for the first time, n corresponding column buffers are used as target column buffers for the n columns of data read this time, where the n corresponding column buffers are obtained by sliding the first n column buffers, which store n columns of data read last time, by m columns according to the predetermined cyclic direction in the first buffer, and the n columns of data read this time are stored into the target column buffers correspondingly.

In the next optional example, when n columns of data read not for the first time are stored into the first buffer, data in the last n-m column buffers of n column buffers, storing data last time, in the first buffer is overwritten.

Corresponding to the still another optional example described above, the reading input window data to be processed from the at least one input buffer sequentially and performing convolution on the input window data to be processed by using the convolution kernel data includes the following operations:

for the task to be processed, when input window data to be processed is read for the first time, the first n column buffers are selected as a current computing buffer, input window data with a size of n×n is read from the current computing buffer sequentially according to the sliding step m, and convolution is performed on the input window data to be processed by using the convolution kernel data, until all data to be processed in the current computing buffer is read; and then n column buffers are selected as a new computing buffer via sliding from the previous computing buffer according to the sliding step m and the predetermined cyclic direction each time, input window data with a size of n×n is read from the new computing buffer sequentially according to the sliding step m, and convolution is performed on the input window data to be processed by using the convolution kernel data, until all data to be processed in the new computing buffer is read.

Corresponding to the yet another optional example described above, the output buffer may also include m column buffers. Accordingly, the obtaining the output window data and storing the output window data in the at least one output buffer sequentially includes the following steps:

one of the output buffers is selected as a current output buffer, and output window data obtained by performing convolution on each piece of input window data is stored in the m column buffers of the current output buffer sequentially; and in response to storage of output window data obtained by performing convolution on all input window data in one computing buffer being completed, another output buffer is selected as a current output buffer, and the operation of storing sequentially output window data, obtained by performing convolution on each piece of input window data, in the m column buffers of the current output buffer is performed.

The storing the output window data in the third buffer into the off-chip memory sequentially includes the following step:

in response to storage of output window data obtained by performing convolution on all input window data in the current column buffer being completed, the output window data in the current output buffer is stored into the off-chip memory.

According to one or more embodiment of the present disclosure, the technical solution that the input buffer is a column buffer is similar to the technical solution that the input buffer is a line buffer, and the associated parts therebetween may be used as reference.

Figure 3:
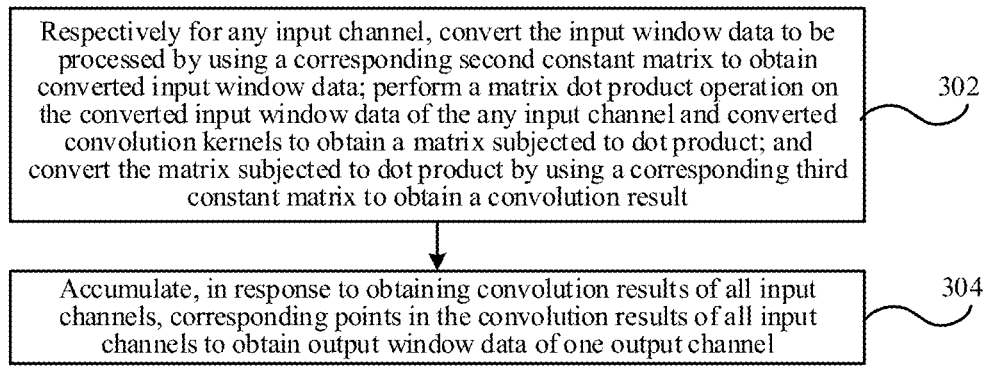
FIG. 3 is a flowchart of an embodiment of performing convolution on input window data to be processed in embodiments of the present disclosure.

FIG. 3 is a flowchart of an embodiment of performing convolution on input window data to be processed in embodiments of the present disclosure. As shown in FIG. 3, the performing convolution on the input window data to be processed by using the convolution kernel data and obtaining output window data includes the following steps.

At block 302, the following computing processing operations are performed for any input channel respectively: converting the input window data to be processed through a corresponding second constant matrix to obtain converted input window data; performing a matrix dot product operation on the converted input window data of the any input channel and the converted convolution kernels to obtain a matrix subjected to dot product; and converting the matrix subjected to dot product through a corresponding third constant matrix to obtain a convolution result.

In the above embodiment, the at least one set of convolution kernel data includes at least one set of converted convolution kernels, where any set of converted convolution kernels is obtained by converting convolution kernels corresponding to one output channel through a corresponding first constant matrix.

In an optional example, the operations in block 302 may be executed by a processor by invoking a corresponding instruction stored in a memory, or may be executed by a Processing Element (PE) run by the processor.

At block 304, in response to obtaining convolution results of all input channels, corresponding points in the convolution results of all input channels corresponding to one output channel are accumulated to obtain output window data of the output channel.

According to one or more embodiment of the present disclosure, in another embodiment, when converting the input window data to be processed through a corresponding second constant matrix, the following operation may also be executed: converting respectively convolution kernels corresponding to the at least one output channel through the corresponding first constant matrix to obtain at least one set of converted convolution kernels.

According to one or more embodiment of the present disclosure, convolution kernels corresponding to the at least one output channel may also be converted respectively through the corresponding first constant matrix in advance to obtain the at least one set of converted convolution kernels, and the converted convolution kernels are stored in the second buffer. In this way, consumption of computing resources caused by temporary execution of this operation is avoided, thereby further improving the computing efficiency.

In an optional example, the operation in block 304 may be executed by a processor by invoking a corresponding instruction stored in a memory, or may be executed by an accumulating unit run by the processor.

Exemplarily, in at least one embodiment shown in FIG. 3, the converting the input window data to be processed through a corresponding second constant matrix may be implemented by: performing a bitwise operation on input window data to be processed in any input channel by means of a logical resource in the accelerator respectively according to the corresponding second constant matrix.

Similarly, the converting the matrix subjected to dot product through a corresponding third constant matrix may be implemented by: performing a bitwise operation on the matrix subjected to dot product in any input channel by means of a logical resource in the accelerator respectively according to the corresponding third constant matrix.

Similarly, the converting respectively convolution kernels corresponding to the at least one output channel through the corresponding first constant matrix may be implemented by: performing a bitwise operation on the convolution kernel corresponding to the at least one output channel by means of a logical resource in the accelerator respectively according to the corresponding first constant matrix. The conversion operations of the input window data, the convolution kernel data, and the matrix subjected to dot product are implemented by means of logical resources in the accelerator and binary bitwise operations, so that it is not necessary to provide a multiplier in the accelerator to implement the corresponding conversion operations, thereby reducing the number of multiplications in convolution, saving DSP resources in the accelerator, and improving the computing efficiency of the accelerator and the utilization rate of DSP resources in the accelerator.

According to one or more embodiment of the present disclosure, before the process of the embodiment shown in FIG. 3, the method may further include the following step:

The first constant matrix (represented as G in the embodiments of the present disclosure), the second constant matrix (represented as B in the embodiments of the present disclosure), and the third constant matrix (represented as A in the embodiments of the present disclosure) corresponding to the size r×r of the convolution kernel and the size n×n of the input window are queried respectively from a constant matrix table.

The constant matrix table is provided in advance through a first constant matrix, a second constant matrix, and a third constant matrix which are corresponding to the size of at least one convolution kernel and the size of the input window respectively, that is, after the size of the convolution kernel and the size of the input window are determined, the first constant matrix, the second constant matrix, and the third constant matrix may be determined.

In addition, in the embodiments shown in FIG. 3 above, the performing the following computing operations for any input channel respectively includes: simultaneously performing the computing processing operations for Pm output channels and Pn input channels, where Pm and Pn are respectively integers greater than 0. Accordingly, the operation in block 304 is: for the Pm output channels, in response to obtaining convolution results of all input channels, accumulating respectively corresponding points in the convolution results of all input channels for one output channel to obtain output window data of the Pm output channels. By means of the embodiments, parallel processing for Pm output channels and Pn input channels is implemented, and the computing processing efficiency is improved.

In one optional example, the value of Pm is 1, and the value of Pn is an integer greater than 1; and the simultaneously performing the computing processing operations for Pm output channels and Pn input channels may include: sequentially performing the computing processing operations in parallel for one output channel and all input channels, or one output channel and some input channels in all input channels. By the embodiments, parallel processing for one output channel and Pn input channels each time is implemented.

In another optional example, the value of Pm is the number of all output channels, and the value of Pn is 1; and the simultaneously performing the computing processing operations for Pm output channels and Pn input channels may include: for all output channels simultaneously, performing sequentially the computing processing operations for one input channel.

Accordingly, the operation in block 304 may include: for all output channels, in response to obtaining convolution results of all input channels, accumulating respectively corresponding points in the convolution results of all input channels for one output channel to obtain output window data of all output channels.

By the embodiments, parallel processing for one input channel and all output channels each time is implemented.

In yet another optional example, the value of Pm is greater than 1 and less than the number of all output channels, and the value of Pn is 1; and the simultaneously performing the computing processing operations for Pm output channels and Pn input channels includes: for some output channels in all output channels simultaneously, performing sequentially the computing processing operations for one input channel.

By the embodiments, parallel processing for one input channel and Pm output channels each time is implemented.

Figure 4:
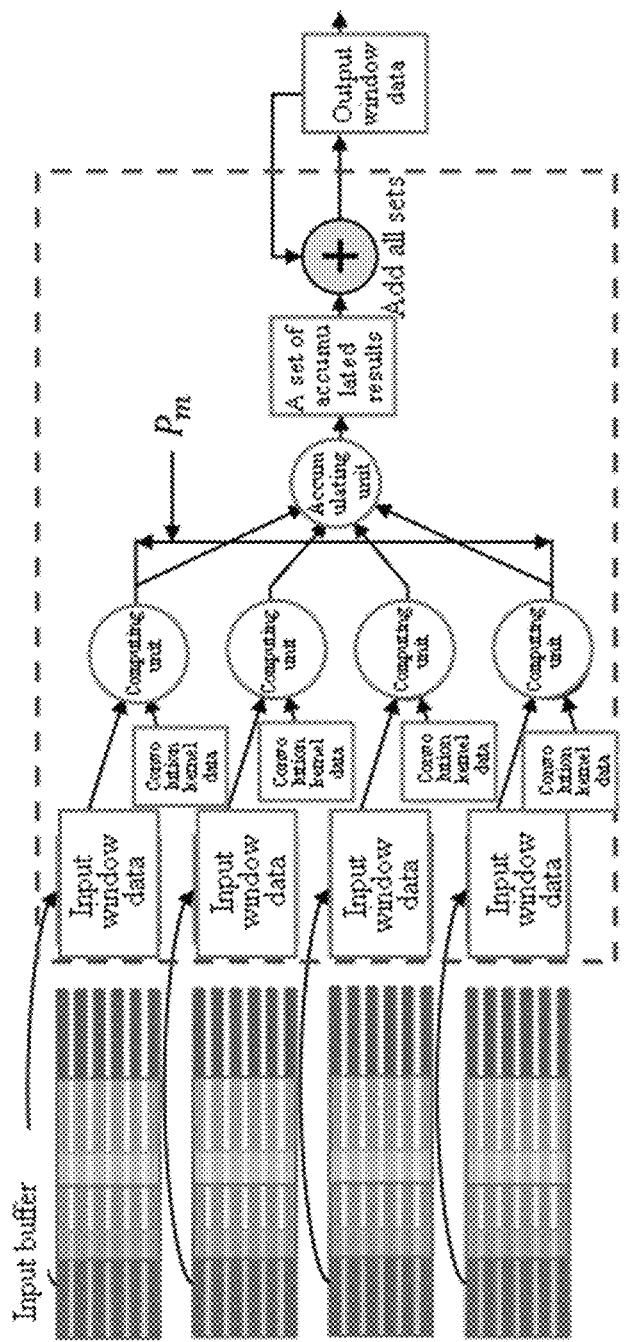
FIG. 4 is a schematic diagram of performing computing processing operations on Pn input channels in parallel in embodiments of the present disclosure.
Figure 5:
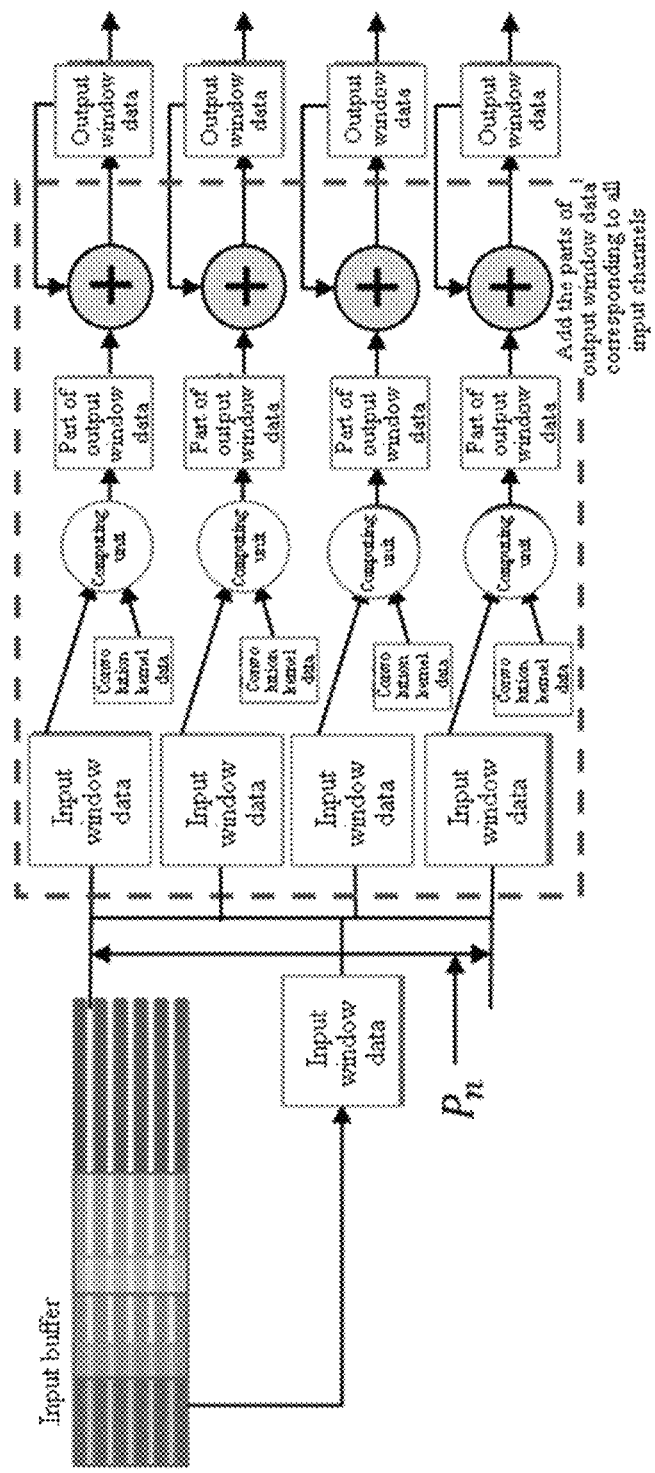
FIG. 5 is a schematic diagram of performing computing processing operations on Pm output channels in parallel in embodiments of the present disclosure.

FIG. 4 is a schematic diagram of performing computing processing operations on Pn input channels in parallel in embodiments of the present disclosure. In FIG. 4, Pn input channels are only a part of all input channels, corresponding convolution results thereof are accumulated to form a set of accumulated results corresponding to the Pn input channels, and the accumulated results of all the sets corresponding to the input channels are added to obtain output window data of one output channel. FIG. 5 is a schematic diagram of performing computing processing operations on Pm output channels in parallel in embodiments of the present disclosure. Since only a part of output window data may be obtained by operation of input window data of each input channel, for one output channel, convolution results corresponding to input window data of all input channels are accumulated to obtain output window data of the output channel.

In addition, before the foregoing embodiments of the convolution acceleration methods according to the present disclosure, the method may further include the following step:

optimal values of parameters in convolution are obtained based on the transmission bandwidth of the FIFO port and the resource condition of the accelerator according to a parameter optimization model, where the parameters in convolution includes: the size of the input window, the degree of parallelism of the output channel, and the degree of parallelism of the input channel, and the optimal values of the parameters includes: the optimal value n of the size of the input window, the optimal value Pm of the degree of parallelism of the output channel, and the optimal value Pn of the degree of parallelism of the input channel.

In the above embodiments of the convolution acceleration methods according to the present disclosure, the reading data to be processed of a preset size in a task to be processed from an off-chip memory of the accelerator sequentially through a FIFO port may include:

an operation that the accelerator receives, through the FIFO port, a task processing instruction sent by a processor, and reads sequentially data to be processed of the preset size in the task to be processed from the off-chip memory of the accelerator through the FIFO port.

In addition, the convolution acceleration method according to the embodiments of the present disclosure may further include the following step:

in response to completion of the convolution acceleration of the task to be processed, the accelerator feeds back a task completion response message to the processor through the FIFO port. The above operation of obtaining optimal values of parameters in convolution may be performed by a processor such as a Central Processing Unit (CPU) or an Advanced RISC Machine (ARM). When the accelerator needs to be scheduled for acceleration computing, a processor such as a CPU or an ARM obtains optimal values of parameters in convolution, and uses the optimal values of the parameters in convolution to configure the accelerator, and after the configuration is completed, the accelerator may execute a corresponding acceleration method flow based on the above optimal values of the parameters to process the task to be processed. Therefore, the optimal resource utilization rate is achieved for the accelerator, and the acceleration effect is maximized. When simultaneously performing the computing processing operations for Pm output channels and Pn input channels, Pm output channels and Pn input channels are selected sequentially based on the values of Pm and Pn in the optimal values of the parameters, and the computing processing operations are simultaneously performed for Pm output channels and Pn input channels.

In yet another embodiment of the present disclosure, before the foregoing embodiments of the convolution acceleration method, the method may further include the following steps:

whether the size k×k of a convolution kernel of the current task to be processed is consistent with the size r×r of the convolution kernel corresponding to the accelerator is determined; and if not, the convolution kernel of the current task to be processed is padded with a columns of 0s on the right and b rows of 0s at the bottom, so that the convolution kernel of the current task to be processed is converted into a new convolution kernel with a size of tr×tr.

The values of k, t, a, and b are respectively integers greater than 0.

Since the sizes of different convolution kernels and the sizes of input windows correspond to different first constant matrices, second constant matrices, and third constant matrices, when the size of a convolution kernel required for the present task to be processed is different from the size of a convolution kernel corresponding to an existing accelerator, the size of the convolution kernel required for the present task to be processed may be converted into a convolution kernel corresponding to t2 accelerators based on the above embodiments, thereby implementing reuse of the convolution kernel corresponding to the existing accelerator, avoiding recomputing to obtain a first constant matrix, a second constant matrix and a third constant matrix and re-conversion operation based on the convolution kernel, and improving the processing efficiency.

In addition, the accelerator in the embodiments of the present disclosure may be used in acceleration of convolution of any network layer in a CNN, for example, may be used for convolution acceleration operations of network layers, such as a convolutional layer, a Fully Connected (FC) layer, a pooling layer, an activation function ReLU (rectified linear unit) layer, a padding layer, and upsample layer, in a CNN. Moreover, in addition to convolution acceleration in a CNN, the accelerator may also be applied in other convolution operations in any other non-CNN. The exemplary description of the embodiments of the present disclosure does not constitute a limitation of the application environment of the embodiments of the present disclosure.

For example, in the above embodiments of the present disclosure, when being compatible with a full connection operation in a CNN, the method may further include the following steps:

in response to the need to perform a full connection operation on the task to be processed, all data to be processed of the task to be processed is read from the off-chip memory of the accelerator through the FIFO port, and stored in the first buffer;

a matrix dot product operation is performed on all the data to be processed and the converted convolution kernels stored in the second buffer to obtain a matrix subjected to dot product;

the matrix subjected to dot product is converted through the corresponding third constant matrix, and computing result data is obtained and stored in the third buffer; and the computing result data in the third buffer is stored into the off-chip memory sequentially through the FIFO port.

In the above embodiments of the present disclosure, when being compatible with a full connection operation in a CNN, the method may further include the following steps:

in response to the need to perform a pooling operation on the task to be processed, data to be processed of the preset size in the task to be processed is read sequentially from the off-chip memory of the accelerator through the FIFO port, and stored in the first buffer;

one piece of data with the largest value is selected from the data to be processed of the preset size as computing result data, and the computing result data is stored in the third buffer; and the computing result data in the third buffer is stored into the off-chip memory sequentially through the FIFO port.

In the above embodiments of the present disclosure, when being compatible with an activation function operation in a CNN, the method may further include the following steps:

in response to the need to perform an activation function operation on the task to be processed, data to be processed of the preset size in the task to be processed is read sequentially from the off-chip memory of the accelerator through the FIFO port, and stored in the first buffer;

whether the value of any piece of the data to be processed is less than 0 is determined sequentially;

if the value of a piece of data is less than 0, 0 is stored in the third buffer as a computing result of the piece of data; if a value of the piece of data is not less than 0, the value of the piece of data is stored directly in the third buffer as a computing result; and the computing results in the third buffer are stored into the off-chip memory sequentially through the FIFO port.

In the above embodiments of the present disclosure, when being compatible with an upsampling operation in a CNN, the method may further include the following step:

in response to the need to perform an upsampling operation on the task to be processed, one piece of element data in the task to be processed is read sequentially from the off-chip memory of the accelerator through the FIFO port, the element data is copied into an element matrix of 2s×2s, and the operation of storing sequentially the data to be processed into at least one input buffer of a first buffer in an on-chip memory of the accelerator is started by using the element matrix as data to be processed, where the value of s is an integer greater than 0.

In the above embodiments of the present disclosure, when being compatible with a padding operation in a CNN, the method may further include the following steps:

in response to the need to perform a padding operation on the task to be processed, all data of the task to be processed is read from the off-chip memory of the accelerator through the FIFO port, and stored in the first buffer;

whether the data size of the task to be processed is smaller than the preset size is determined;

if the data size of the task to be processed is smaller than the preset size, edge data padding is performed on the task to be processed in a preset manner so that the data size of the task to be processed after padding is equal to the preset size, and the task to be processed after padding is stored in the third buffer; if the data size of the task to be processed is not smaller than the preset size, the task to be processed is stored directly in the third buffer; and the data of the task to be processed in the third buffer is stored into the off-chip memory sequentially through the FIFO port.

Figure 6:
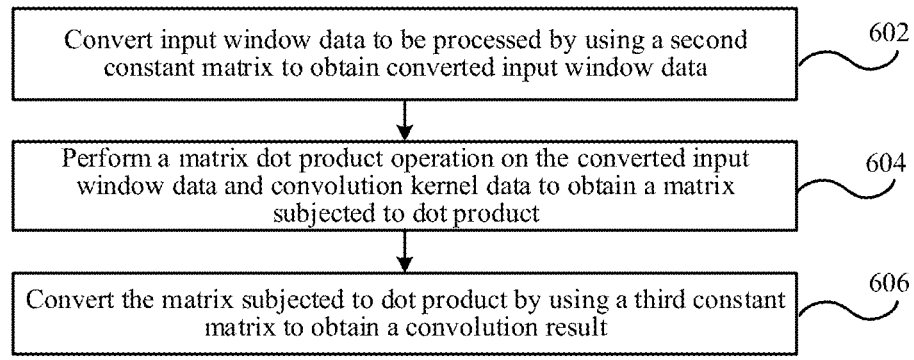
FIG. 6 is a flowchart of an embodiment of a convolution processing method according to the present disclosure.

FIG. 6 is a flowchart of an embodiment of a convolution processing method according to the present disclosure. As shown in FIG. 6, the convolution processing method according to the embodiments of the present disclosure includes the following steps, for any input channel and any output channel.

At block 602, input window data Z to be processed is converted through a second constant matrix B to obtain converted input window data V.

For example, input window data Z to be processed may be converted by a second constant matrix B corresponding to an output window size and a convolution kernel size according to an equation V=BTZB to obtain converted input window data V.

In an optional example, the operation in block 602 may be executed by a processor by invoking a corresponding instruction stored in a memory, or may be executed by a first conversion module run by the processor.

At block 604, a matrix dot product (EWMM) operation is performed on the converted input window data V and convolution kernel data U to obtain a matrix U⊙V after dot product.

In an optional example, a matrix dot product operation may be performed on the converted input window data and convolution kernel data with a DSP to obtain a matrix U⊙V after dot product.

For example, a matrix dot product operation may be performed on the converted input window data V and convolution kernel data U by an equation U⊙V to obtain a matrix subjected to dot product.

The convolution kernel data U is obtained by converting a preset convolution kernel (represented as X in the embodiments of the present disclosure) by a corresponding first constant matrix G.

In an optional example, the operation in block 604 may be executed by a processor by invoking a corresponding instruction stored in a memory, or may be executed by a dot product module run by the processor.

At block 606, the matrix U⊙V after dot product is converted by using a third constant matrix A to obtain a convolution result Y, which may be represented as Y=AT⌊U⊙V⌋A.

The third constant matrix A is a third constant matrix corresponding to the output window size and the convolution kernel size.

In an optional example, the operation in block 606 may be executed by a processor by invoking a corresponding instruction stored in a memory, or may be executed by a second conversion module run by the processor.

According to the convolution processing method provided in the above embodiment of the present disclosure, for any input channel and any output channel, input window data to be processed may be converted through a second constant matrix to obtain converted input window data; a matrix dot product operation is performed on the converted input window data and convolution kernel data to obtain a matrix subjected to dot product; and the matrix subjected to dot product is converted through a third constant matrix to obtain a convolution result. The embodiments of the present disclosure provide a method for performing surface-to-surface convolution on input window data based on a Winograd algorithm. Compared with a conventional point-to-point convolution algorithm, the number of multiplications is reduced, and thus, the occupation of processor resources is reduced and the computing efficiency is improved. The embodiments of the present disclosure may be applied to a hardware platform such as an FPGA and an ASIC, thereby implementing convolution acceleration processing on the hardware platform such as an FPGA and an ASIC. When the embodiments of the present disclosure are applied to an FPGA platform, the advantages of reconfigurability, parallel computing, short development cycle, low power consumption, and high flexibility of the FPGA platform may be fully utilized.

According to one or more embodiment of the present disclosure, in another embodiment of the convolution processing method according to the present disclosure, the method may further include the following operations.

The convolution kernel X of any output channel is converted with the first constant matrix G corresponding to the output window size and the convolution kernel size in advance to obtain the convolution kernel data U and the convolution kernel data U is stored. For example, the convolution kernel X may be converted with the corresponding first constant matrix G in advance by an equation U=GXGT to obtain the convolution kernel data U. Each piece of convolution kernel data corresponds to one input channel.

Figure 7:
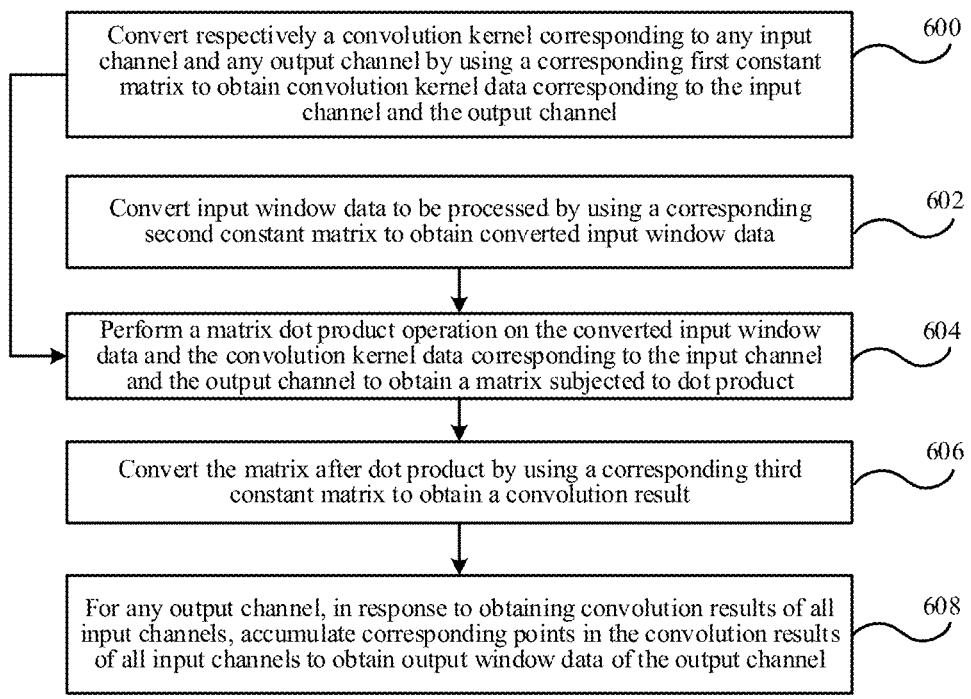
FIG. 7 is a flowchart of another embodiment of a convolution processing method according to the present disclosure.

FIG. 7 is a flowchart of another embodiment of a convolution processing method according to the present disclosure. According to one or more embodiment of the present disclosure, in another embodiment of the convolution processing method according to the present disclosure, before the operation in block 604, the method may further include the following step.

At block 600, a convolution kernel is converted with the first constant matrix G to obtain flash convolution kernel data.

According to one or more embodiment of the present disclosure, the first constant matrix G is a first constant matrix corresponding to the output window size and the convolution kernel size.

In an optional example, the operation in block 600 may be executed by a processor by invoking a corresponding instruction stored in a memory, or may be executed by a third conversion module run by the processor.

Exemplarily, the converting input window data to be processed with a second constant matrix may be: performing a bitwise operation on input window data to be processed by means of a logical resource in the accelerator according to the second constant matrix; the converting the matrix subjected to dot product with a third constant matrix may be: performing a bitwise operation on the matrix subjected to dot product by means of a logical resource in the accelerator according to the third constant matrix; and the converting a convolution kernel with a first constant matrix may be: performing a bitwise operation on the convolution kernel by means of a logical resource in the accelerator according to the first constant matrix. By using logical resources in the accelerator to perform bitwise operations, the convolution kernel, the input window data, and the matrix subjected to dot product are converted without using DSP resources, thereby reducing the number of multiplications, saving DSP resources, and improving the computing efficiency of the accelerator and the utilization rate of DSP resources.

In the above embodiment based on the embodiment shown in FIG. 7, the method may further include the following operation.

The first constant matrix, the second constant matrix, and the third constant matrix corresponding to the size r×r of the convolution kernel corresponding to the convolution kernel data and the size n×n of an input window corresponding to the input window data are queried respectively from a constant matrix table, The values of n and r are respectively integers greater than 0, and the constant matrix table is provided in advance with a first constant matrix, a second constant matrix, and a third constant matrix which are corresponding to the size of at least one convolution kernel and the size of the input window respectively.

According to one or more embodiment of the present disclosure, referring to FIG. 7 again, in yet another embodiment of the convolution processing method according to the present disclosure, the method may further include the following step.

At block 608, for any output channel, in response to obtaining convolution results of all input channels, corresponding points in the convolution results of all input channels corresponding to the output channel are accumulated to obtain output window data of the output channel. That is, based on a set of convolution kernel data corresponding to one output channel, convolution is performed on input window data of all input channels by the flow of the embodiment shown in FIG. 7 to obtain output window data of the output channel. If output window data of one output channel is represented as "Out", and input window data of all input channels is represented as "in", then the convolution process in the embodiment shown in FIG. 7 may be expressed as a process of processing the input window data of all input channels and the convolution kernel data based on the following equation:

$$\text{Out} = A^T[(GXG^T) \odot (B^T \text{in} B)]A$$

In an optional example, the operation in block 608 may be executed by a processor by invoking a corresponding instruction stored in a memory, or may be executed by an accumulating unit run by the processor.

Figure 8:
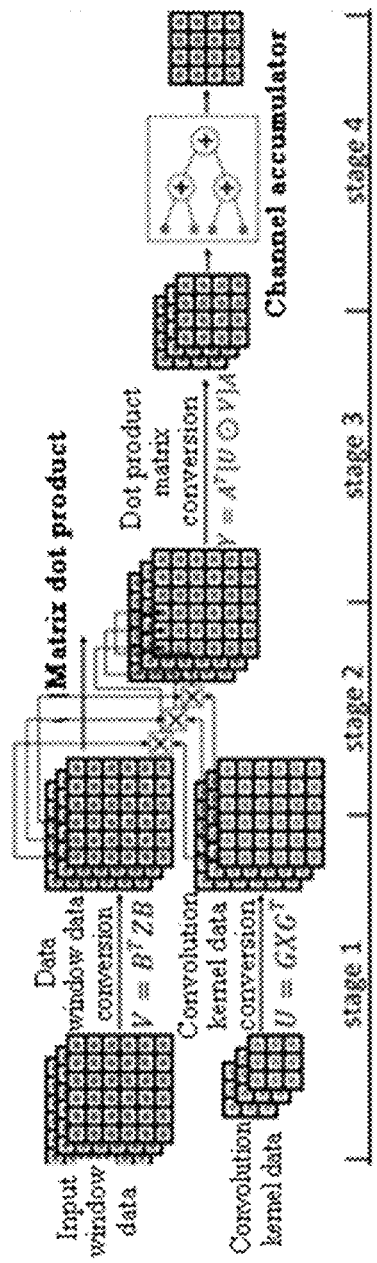
FIG. 8 is a schematic diagram of a computing process according to embodiments shown in FIGS. 3, 7, and 8.

The convolution processing method according to the embodiment shown in FIG. 8 corresponds to the operations in block 302 in the embodiment shown in FIG. 3, that is, the operations in block 302 in the at least one convolution processing method embodiment may be implemented by a corresponding operation in at least one convolution acceleration method embodiment of the present disclosure. The embodiment shown in FIG. 8 corresponds to at least one embodiment shown in FIGS. 6 and 7, and reference may be made to each other in the embodiments of the present disclosure. FIG. 8 is a schematic diagram of a computing process of the embodiments shown in FIGS. 3, 7, and 8. As shown in FIG. 8, the convolution processing method according to the embodiments of the present disclosure may be divided into four stages: stage 1 representing the stage of operations in blocks 600 and 602 in FIGS. 6 and 7; stage 2 representing the stage of operation in block 604 in FIGS. 6 and 7; stage 3 representing the stage of operation in block 606 in FIGS. 6 and 7; and stage 4 representing the stage of operation in block 608 in FIG. 7. Stages 1 to 3 also represent the stage of operations in block 302 in the embodiment shown in FIG. 3, and stage 4 also represents the stage of operation in block 304 in the embodiment shown in FIG. 3.

FIG. 8 only exemplarily shows input window data Z of three input channels and a set of convolution kernel data corresponding to one output channel, where the set of convolution kernel data includes convolution kernels X corresponding to the three input channels, respectively.

Any method provided by the embodiments of the present disclosure may be executed by any appropriate device having data processing capability, including, but not limited to, a terminal device and a server. Alternatively, any method provided in the embodiments of the present disclosure may be executed by a processor, for example, any method mentioned in the embodiments of the present disclosure is executed by the processor by invoking a corresponding instruction stored in a memory. Details are not described below again.

A person of ordinary skill in the art may understand that all or some steps of implementing the forgoing embodiments of the method may be achieved by a program by instructing related hardware; the program can be stored in a computer readable storage medium; when the program is executed, steps including the foregoing embodiments of the method are executed. Moreover, the storage medium includes at least one medium capable of storing program code, such as ROM, RAM, a magnetic disk, or an optical disk.

Figure 9:
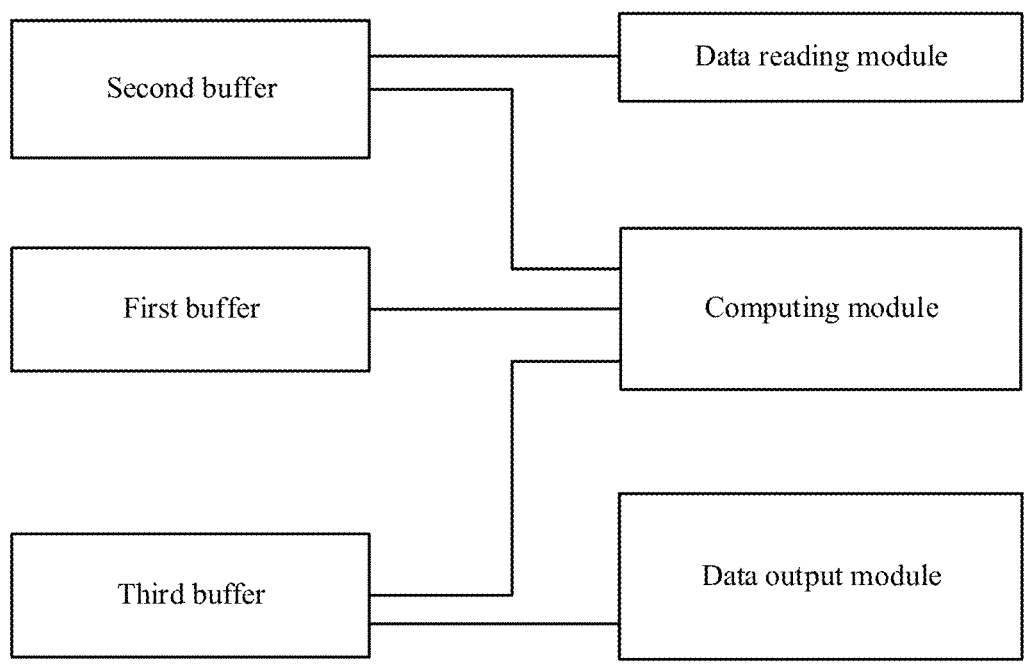
FIG. 9 is a schematic structural diagram of an embodiment of a convolution accelerator according to the present disclosure.

FIG. 9 is a schematic structural diagram of an embodiment of a convolution accelerator according to the present disclosure. The convolution accelerator in this embodiment may be used as the accelerator in at least one of the above embodiments of the present disclosure to implement the functions of the accelerator in the at least one convolution acceleration method embodiment of the present disclosure. The accelerator in at least one embodiment of the present disclosure may be, for example, an embedded platform such as an FPGA or an ASIC. As shown in FIG. 9, the accelerator in this embodiment includes: a data reading module, a first buffer, a second buffer, a computing module, a third buffer, and a data output module.

The data reading module is configured to read data to be processed of a preset size in a task to be processed from an off-chip memory of the accelerator sequentially through a FIFO port, and store the data to be processed into at least one input buffer of a first buffer.

In at least one embodiment of the present disclosure, the task to be processed may include, for example, an input image of at least one input channel, or an input feature map of at least one input channel. In addition, each set of convolution kernel data corresponds to one output channel respectively, each set of convolution kernel data includes at least one piece of convolution kernel data, and each piece of convolution kernel data corresponds to one input channel respectively.

The first buffer includes at least one input buffer and is configured to buffer the data to be processed.

The second buffer is configured to buffer at least one set of convolution kernel data.

The computing module is configured to read input window data to be processed from the at least one input buffer sequentially when data to be processed is stored into an input buffer, perform convolution on the input window data to be processed by using the convolution kernel data, and obtain output window data and store the output window data in the third buffer.

The third buffer includes at least one output buffer and is configured to buffer the output window data.

The data output module is configured to store the output window data in the third buffer into the off-chip memory sequentially through the FIFO port.

According to the convolution accelerator provided in the foregoing embodiment of the present disclosure, the on-chip memory includes a first buffer, a second buffer, and a third buffer, the first buffer includes at least one input buffer, and at least one set of convolution kernel data. Data to be processed of a preset size in a task to be processed is read from an off-chip memory of an accelerator sequentially through a FIFO port, and is stored into at least one input buffer of a first buffer in an on-chip memory of the accelerator; in response to data to be processed being stored into an input buffer, input window data to be processed is read from the at least one input buffer sequentially, convolution is performed on the input window data to be processed by using convolution kernel data, and output window data is obtained and stored in a third buffer; and then the output window data in the third buffer is stored into the off-chip memory sequentially through the FIFO port. According to the embodiments of the present disclosure, data to be processed of a preset size in a task to be processed is read from an off-chip memory of an accelerator and stored into the on-chip memory for processing each time, and pipeline processing for two procedures, i.e., reading data to be processed from the off-chip memory and storing it on the on-chip memory, and performing convolution processing on the data to be processed, is implemented. The embodiments of the present disclosure can avoid the problems of insufficient on-chip memory of an accelerator and bandwidths and limited processor resources, improve the efficiency of convolution processing, and may be applied to a hardware platform such as an FPGA and an ASIC, thereby implementing acceleration processing of a CNN on the hardware platform such as an FPGA and an ASIC. When the embodiments of the present disclosure are applied to an FPGA platform, the advantages of reconfigurability, parallel computing, short development cycle, low power consumption, and high flexibility of the FPGA platform may be fully utilized.

In an optional example of the embodiment shown in FIG. 9, the data output module is configured to: in response to output window data being stored in the first output buffer, sequentially read output window data in the at least one output buffer, and store the read output window data into the off-chip memory through the FIFO port.

Exemplarily, the third buffer includes two output buffers. During processing the task to be processed, storage of output window data and reading of output window data are performed on one of the two output buffers alternately, and reading of output window data and storage of output window data are performed on the other of the two output buffers alternately. When output window data is stored into one of the two output buffers, output window data is read from the other of the two output buffers, and when output window data is read from the former, output window data is stored into the other. Thus, pipeline processing for storage of output window data and reading of output window data is implemented, and the working efficiency of the accelerator is improved.

In another optional example of the embodiment shown in FIG. 9, the first buffer includes two input buffers. During processing the task to be processed, storage of data to be processed and reading of input window data to be processed are performed on one of the two input buffers alternately, and reading of input window data to be processed and storage of data to be processed are performed on the other of the two input buffers alternately. When data to be processed is stored in one of the two input buffers, input window data to be processed is read from the other of the two input buffers, and when input window data to be processed is read from the former, data to be processed is stored in the other. Thus, pipeline processing for storage of data to be processed and reading of input window data to be processed is implemented.

In the embodiments of the present disclosure, the size of a convolution kernel corresponding to the convolution kernel data is represented as r×r, the size of an input window corresponding to the input window data is represented as n×n, the sliding step of the input window corresponding to the input window data and the size of an output window corresponding to the input window data are represented as m. The values of r, m, and n are respectively integers greater than 0 and satisfy the condition that n=m+r−1.

In yet another optional example of the embodiment shown in FIG. 9, the input buffer is a line buffer; the first buffer is a cyclic buffer formed by n+m line buffers, and each of the line buffers is used for storing sequentially data in the same row in all channels of the task to be processed. In this embodiment, the data reading module is configured to:

read the first n rows of data in all channels of the task to be processed from the off-chip memory for the first time, and store correspondingly the first n rows of data into the first n line buffers determined according to a predetermined cyclic direction in the first buffer; and then read m adjacent subsequent rows of data in all channels of the task to be processed from the off-chip memory each time, and store correspondingly the m rows of data read this time into m adjacent subsequent line buffers determined according to the predetermined cyclic direction in the first buffer; or the data reading module is configured to:

read n rows of data in all channels of the task to be processed from the off-chip memory each time;

for the first n rows of data read from the task to be processed for the first time, store correspondingly the first n rows of data into the first n line buffers determined according to a predetermined cyclic direction in the first buffer; and for n rows of data that are read not for the first time, take n corresponding line buffers as target line buffers for the n rows of data read this time, where the n corresponding line buffers are obtained by sliding the first n line buffers, which store n rows of data read last time, by m rows according to the predetermined cyclic direction, in the first buffer, and store the n rows of data read this time into the target line buffers correspondingly.

Corresponding to the yet another optional example described above, when reading input window data to be processed from the at least one input buffer sequentially and performing convolution on the input window data to be processed by using the convolution kernel data, the computing module is configured to:

for the task to be processed, when input window data to be processed is read for the first time, select the first n line buffers as a current computing buffer, read input window data with a size of n×n from the current computing buffer sequentially according to the sliding step m, and perform convolution on the input window data to be processed by using the convolution kernel data, until all data to be processed in the current computing buffer is read; and then select n line buffers as a new computing buffer via sliding from the previous computing buffer according to the sliding step m and the predetermined cyclic direction each time, read input window data with a size of n×n from the new computing buffer sequentially according to the sliding step m, and perform convolution on the input window data to be processed by using the convolution kernel data, until all data to be processed in the new computing buffer is read.

Corresponding to the yet another optional example described above, each output buffer includes m line buffers. Accordingly, when obtaining the output window data and storing the output window data in the at least one output buffer sequentially, the computing module is configured to:

select one of the output buffers as a current output buffer, and store sequentially output window data, obtained by performing convolution on each piece of input window data, in the m line buffers of the current output buffer; and in response to storage of output window data obtained by performing convolution on all input window data in one computing buffer being completed, select another output buffer as a current output buffer, and perform the operation of storing sequentially output window data, obtained by performing convolution on each piece of input window data, in the m line buffers of the current output buffer.

The data output module is configured to: in response to storage of output window data obtained by performing convolution on all input window data in the current computing buffer being completed, store the output window data in the current output buffer into the off-chip memory.

In still another optional example of the embodiment shown in FIG. 9, the input buffer is a column buffer; the first buffer is a cyclic buffer formed by n+m column buffers, and each of the column buffers is used for sequentially storing data in the same column in all channels of the task to be processed. Accordingly, the data reading module is configured to:

read the first n columns of data in all channels of the task to be processed from the off-chip memory for the first time, and store correspondingly the first n columns of data into the first n column buffers determined according to a predetermined cyclic direction in the first buffer; and then read m adjacent subsequent columns of data in all channels of the task to be processed from the off-chip memory each time, and store correspondingly the m columns of data read this time into m adjacent subsequent column buffers determined according to the predetermined cyclic direction in the first buffer.

Corresponding to the still another optional example described above, when reading input window data to be processed from the at least one input buffer sequentially and performing convolution on the input window data to be processed by using the convolution kernel data, the computing module is configured to:

for the task to be processed, when input window data to be processed is read for the first time, select the first n column buffers as a current computing buffer, read input window data with a size of n×n from the current computing buffer sequentially according to the sliding step m, and perform convolution on the input window data to be processed by using the convolution kernel data, until all data to be processed in the current computing buffer is read; and then select n column buffers as a new computing buffer via sliding from the previous computing buffer according to the sliding step m and the predetermined cyclic direction each time, read input window data with a size of n×n from the new computing buffer sequentially according to the sliding step m, and perform convolution on the input window data to be processed by using the convolution kernel data, until all data to be processed in the new computing buffer is read; or the data reading module is configured to:

read n columns of data in all channels of the task to be processed from the off-chip memory each time;

for the first n columns of data read from the task to be processed for the first time, store correspondingly the first n columns of data into the first n column buffers determined according to a predetermined cyclic direction in the first buffer; and for n columns of data that are read not for the first time, use n corresponding column buffers as target column buffers for the n columns of data read this time, where the n corresponding column buffers are obtained by sliding the first n column buffers, which store n columns of data read last time, by m columns according to the predetermined cyclic direction in the first buffer, and store the n columns of data read this time into the target column buffers correspondingly.

Corresponding to the still another optional example described above, the output buffer includes m column buffers. In the optional example, when obtaining the output window data and storing the output window data in the at least one output buffer sequentially, the computing module is configured to:

select one of the output buffers as a current output buffer, and store sequentially output window data, obtained by performing convolution on each piece of input window data, in the m column buffers of the current output buffer; and in response to storage of output window data obtained by performing convolution on all input window data in one computing buffer being completed, select another output buffer as a current output buffer, and perform the operation of storing sequentially output window data, obtained by performing convolution on each piece of input window data, in the m column buffers of the current output buffer.

Accordingly, the data output module is configured to: in response to storage of output window data obtained by performing convolution on all input window data in the current computing buffer being completed, store the output window data in the current output buffer into the off-chip memory.

Figure 10:
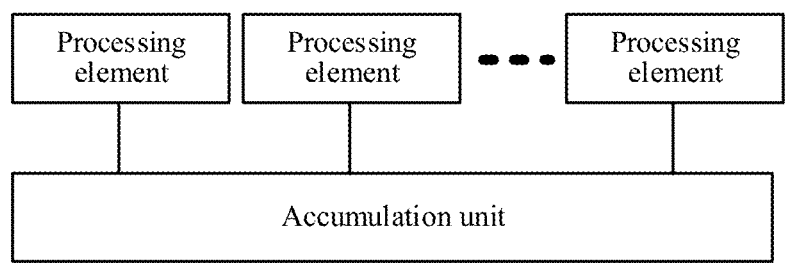
FIG. 10 is a schematic structural diagram of an embodiment of a computing module according to embodiments of the present disclosure.

FIG. 10 is a schematic structural diagram of an embodiment of a computing module according to embodiments of the present disclosure. As shown in FIG. 10, in the accelerator of the at least one embodiment of the present disclosure, the computing module includes: a PE and an accumulating unit.

In an optional example of the embodiment shown in FIG. 10, the convolution kernel data is converted convolution kernels. In this embodiment, the PE is configured to perform the following computing processing operations for any input channel respectively: converting the input window data to be processed through a corresponding second constant matrix to obtain converted input window data; performing a matrix dot product operation on the converted input window data of the any input channel and the converted convolution kernels to obtain a matrix subjected to dot product; and converting the matrix subjected to dot product through a corresponding third constant matrix to obtain a convolution result; and the accumulating unit is configured to accumulate, after obtaining convolution results of all input channels corresponding to one output channel, corresponding points in the convolution results of all input channels to obtain output window data of the output channel.

In an optional example of the embodiment shown in FIG. 10, the convolution kernel data is convolution kernels that are not converted. In this embodiment, the PE is configured to perform the following computing processing operations for any input channel respectively: converting respectively convolution kernels corresponding to the at least one output channel through the corresponding first constant matrix to obtain at least one set of converted convolution kernels, and converting the input window data to be processed through a corresponding second constant matrix to obtain converted input window data; performing a matrix dot product operation on the converted input window data of the any input channel and the converted convolution kernels to obtain a matrix subjected to dot product; and converting the matrix subjected to dot product through a corresponding third constant matrix to obtain a convolution result; and the accumulating unit is configured to accumulate, after obtaining convolution results of all input channels corresponding to one output channel, corresponding points in the convolution results of all input channels to obtain output window data of the output channel.

Corresponding to the embodiment shown in FIG. 10, when converting the input window data to be processed through a corresponding second constant matrix, a bitwise operation may be performed on the input window data to be processed in the any input channel respectively according to the corresponding second constant matrix; when converting the matrix subjected to dot product through a corresponding third constant matrix, a bitwise operation may be respectively performed on the matrix subjected to dot product in any input channel according to the corresponding third constant matrix; and when converting respectively convolution kernels corresponding to the at least one output channel through the corresponding first constant matrix, a bitwise operation may be performed on the convolution kernel corresponding to the at least one output channel respectively according to the corresponding first constant matrix.

According to one or more embodiment of the present disclosure, the computing module includes Pm×Pn PEs, configured to simultaneously perform the computing processing operations for Pm output channels and Pn input channels, where Pm and Pn are respectively integers greater than 0. Accordingly, the accumulating unit is configured to: for the Pm output channels, in response to obtaining convolution results of all input channels, accumulate respectively corresponding points in the convolution results of all input channels for one output channel to obtain output window data of the Pm output channels.

In application, it can be configured according to actual needs and accelerator resources that: the value of Pm is 1, and the value of Pn is an integer greater than 1; or the value of Pm is the number of all output channels, and the value of Pn is 1; or the value of Pm is greater than 1 and less than the number of all output channels, and the value of Pn is 1.

Figure 11:
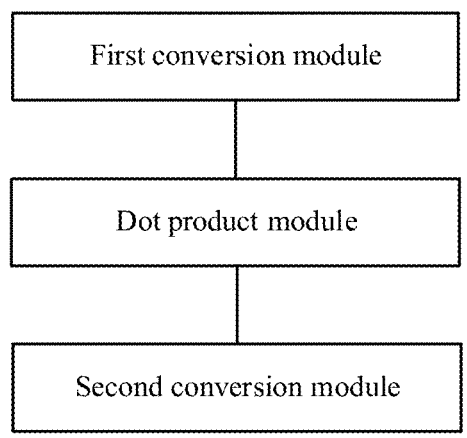
FIG. 11 is a schematic structural diagram of an embodiment of a convolution processing apparatus according to the present disclosure.

FIG. 11 is a schematic structural diagram of an embodiment of a convolution processing apparatus according to the present disclosure. The convolution processing apparatus according to this embodiment may be configured to implement the at least one convolution processing method embodiment of the present disclosure above. As shown in FIG. 11, the convolution processing apparatus according to this embodiment includes: a first conversion module, a dot product module, and a second conversion module.

The first conversion module is configured to convert input window data to be processed through a second constant matrix to obtain converted input window data.

The dot product module is configured to perform a matrix dot product operation on the converted input window data and convolution kernel data to obtain a matrix subjected to dot product. The convolution kernel data is obtained by converting a preset convolution kernel through a corresponding first constant matrix.

The second conversion module is configured to convert the matrix subjected to dot product through a third constant matrix to obtain a convolution result.

According to the convolution processing apparatus provided in the above embodiment of the present disclosure, for any input channel and any output channel, input window data to be processed may be converted through a second constant matrix to obtain converted input window data; a matrix dot product operation is performed on the converted input window data and convolution kernel data to obtain a matrix subjected to dot product; and the matrix subjected to dot product is converted through a third constant matrix to obtain a convolution result. The embodiments of the present disclosure provide a method for performing surface-to-surface convolution on input window data based on a Winograd algorithm. Compared with a conventional point-to-point convolution algorithm, the number of multiplications is reduced, and thus, the occupation of processor resources is reduced and the computing efficiency is improved. The embodiments of the present disclosure may be applied to a hardware platform such as an FPGA and an ASIC, thereby implementing convolution acceleration processing on the hardware platform such as an FPGA and an ASIC. When the embodiments of the present disclosure are applied to an FPGA platform, the advantages of reconfigurability, parallel computing, short development cycle, low power consumption, and high flexibility of the FPGA platform may be fully utilized.

Figure 12:
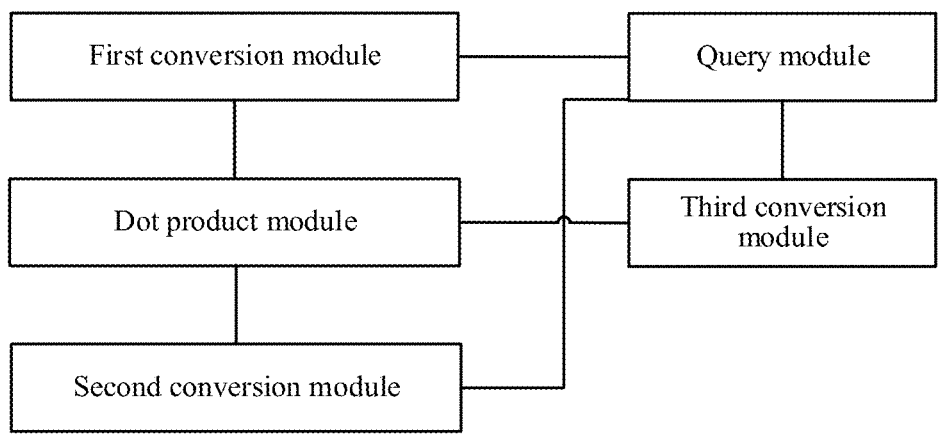
FIG. 12 is a schematic structural diagram of another embodiment of a convolution processing apparatus according to the present disclosure.

FIG. 12 is a schematic structural diagram of another embodiment of a convolution processing apparatus according to the present disclosure. As shown in FIG. 12, the convolution processing apparatus according to this embodiment further includes a third conversion module as compared with the embodiment shown in FIG. 11.

In one optional example, the third conversion module is configured to obtain pre-stored convolution kernel data.

In another optional example, the third conversion module is configured to convert respectively a convolution kernel corresponding to any input channel and any output channel through a corresponding first constant matrix to obtain convolution kernel data corresponding to the input channel and the output channel.

Exemplarily, the first conversion module may be configured to perform a bitwise operation on input window data to be processed respectively according to the corresponding second constant matrix;

the second conversion module may be configured to perform a bitwise operation on the matrix subjected to dot product respectively according to the third constant matrix; and the third conversion module may be configured to perform a bitwise operation on the convolution kernel according to the first constant matrix.

According to one or more embodiment of the present disclosure, referring to FIG. 12, in yet another embodiment, the convolution processing apparatus may further include:

a query module, configured to query respectively, from a constant matrix table, the first constant matrix, the second constant matrix, and the third constant matrix corresponding to the size r×r of the convolution kernel corresponding to the convolution kernel data and the size n×n of an input window corresponding to the input window data, where the values of n and r are respectively integers greater than 0, and the constant matrix table is provided in advance through a first constant matrix, a second constant matrix, and a third constant matrix which are corresponding to the size of at least one convolution kernel and the size of the input window respectively.

The embodiments of the present disclosure further provide an electronic device, including the convolution accelerator according to any of the above embodiments of the present disclosure, or the convolution processing apparatus according to any of the above embodiments of the present disclosure.

The embodiments of the present disclosure further provide another electronic device, including:

a memory, configured to store executable instructions; and a processor, configured to communicate with the memory to execute the executable instructions so as to complete the operations of any of the above convolution acceleration method embodiments of the present disclosure, or the operations of any of the above convolution processing method embodiments of the present disclosure.

The embodiments of the present disclosure further provide a computer storage medium for storing computer-readable instructions, where when the instructions are executed, the operations of any of the above convolution acceleration method embodiments of the present disclosure, or the operations of any of the above convolution processing method embodiments of the present disclosure are performed.

Figure 13:
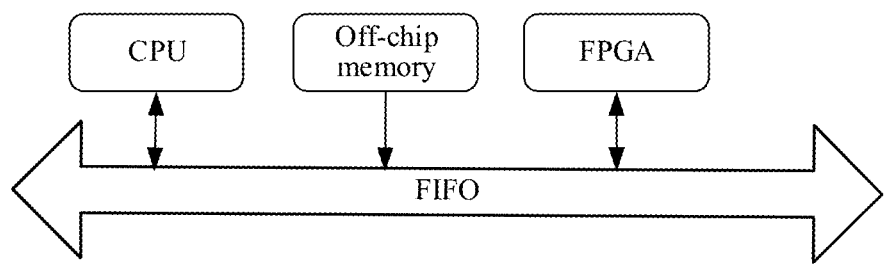
FIG. 13 is a schematic structural diagram of an application embodiment of an electronic device according to the present disclosure.

FIG. 13 is a schematic structural diagram of an embodiment of an electronic device of the present disclosure. FIG. 13 is a schematic structural diagram of an electronic device suitable for implementing the embodiments of the present disclosure. As shown in FIG. 13, the electronic device includes a Double Data Rate Synchronous Dynamic Random-Access Memory (DDR SDRAM), a Processing System (PS), and a programmable logic circuit (PL). The PL is provided with the convolution accelerator according to the embodiments of the present disclosure.

It should be noted that the architecture illustrated in FIG. 13 is merely an optional implementation. During specific practice, the number and types of the components in FIG. 13 may be selected, decreased, increased, or replaced according to actual requirements. Different functional components may be separated or integrated or the like. These alternative implementations all fall within the scope of protection of the present disclosure.

The embodiments of the present disclosure may be applied to electronic devices such as computer systems/servers, which may operate with numerous other general-purpose or special-purpose computing system environments or configurations. Examples of well-known computing systems, environments, and/or configurations suitable for use together with the electronic devices such as the computer systems/servers include, but are not limited to, embedded platforms, personal computer systems, server computer systems, thin clients, thick clients, handheld or laptop devices, microprocessor-based systems, set top boxes, programmable consumer electronics, network personal computers, small computer systems, large computer systems, distributed cloud computing environments that include any one of the foregoing systems, and the like.

The electronic devices such as the computer systems/servers may be described in the general context of computer system executable instructions (for example, program modules) executed by the computer systems. Generally, the program modules may include routines, programs, target programs, components, logics, data structures, and the like for performing specific tasks or implementing specific abstract data types. The computer system/server may be practiced in the distributed cloud computing environments in which tasks are performed by remote processing devices that are linked through a communications network. In the distributed computing environments, the program modules may be located in local or remote computing system storage media including storage devices.

A person of ordinary skill in the art may understand that: all or some steps of implementing the forgoing embodiments of the method may be achieved by a program by instructing related hardware; the foregoing program may be stored in a computer-readable storage medium; when the program is executed, steps including the foregoing embodiments of the method are performed; moreover, the foregoing storage medium includes various media capable of storing program codes such as an ROM, an RAM, a magnetic disk, or an optical disk.

The embodiments in the specification are all described in a progressive manner, for same or similar parts in the embodiments, refer to these embodiments, and each embodiment focuses on a difference from other embodiments. The system embodiments correspond to the method embodiments substantially and therefore are only described briefly, and for the associated part, refer to the descriptions of the method embodiments.

The methods and apparatuses in the present disclosure may be implemented in many manners. For example, the methods and apparatuses in the present disclosure may be implemented with software, hardware, firmware, or any combination of software, hardware, and firmware. The foregoing specific sequence of steps of the method is merely for description, and unless otherwise stated particularly, is not intended to limit the steps of the method in the present disclosure. In addition, in some embodiments, the present disclosure is also implemented as programs recorded in a recording medium. The programs include machine-readable instructions for implementing the methods according to the present disclosure. Therefore, the present disclosure further covers the recording medium storing the programs for performing the methods according to the present disclosure.

The descriptions of the present disclosure are provided for the purpose of examples and description, and are not intended to be exhaustive or limit the present disclosure to the disclosed form. Many modifications and changes are obvious to a person of ordinary skill in the art. The embodiments are selected and described to better describe a principle and an actual application of the present disclosure, and to make persons of ordinary skill in the art understand the present disclosure, so as to design various embodiments with various modifications applicable to particular use.

The invention claimed is:

1. A convolution acceleration method, comprising:
reading sequentially, through a First Input First Output (FIFO) port, data to be processed of a preset size in a task to be processed from an off-chip memory of an accelerator, and storing the data to be processed into at least one input buffer of a first buffer in an on-chip memory of the accelerator, wherein the on-chip memory comprises the first buffer, a second buffer and a third buffer, the first buffer comprises at least one input buffer, and at least one set of convolution kernel data is buffered in the second buffer;

in response to the data to be processed being stored into an input buffer, reading input window data to be processed from the at least one input buffer sequentially, performing convolution on the input window data to be processed by using the convolution kernel data to obtain output window data and storing the output window data in the third buffer; and storing, through the FIFO port, the output window data in the third buffer into the off-chip memory sequentially;

wherein the at least one set of convolution kernel data comprises at least one set of converted convolution kernels, wherein any set of converted convolution kernels is obtained by converting convolution kernels corresponding to one output channel through a corresponding first constant matrix; and wherein the performing convolution on the input window data to be processed by using the convolution kernel data to obtain output window data comprises:

performing the following computing processing operations for any input channel respectively:
converting the input window data to be processed through a corresponding second constant matrix to obtain converted input window data;
performing a matrix dot product operation on the converted input window data of the any input channel and the converted convolution kernels to obtain a matrix subjected to dot product;
converting the matrix subjected to dot product through a corresponding third constant matrix to obtain a convolution result; and
in response to obtaining convolution results of all input channels, accumulating corresponding points in the convolution results of all input channels to obtain output window data of one output channel.

2. The method according to claim 1, wherein the task to be processed comprises an input image of at least one input channel, or an input feature map of the at least one input channel; and
each set of convolution kernel data corresponds to one output channel, each set of convolution kernel data comprises at least one convolution kernel data, and each convolution kernel data corresponds to one input channel.

3. The method according to claim 1, wherein the third buffer comprises at least one output buffer;
the obtaining output window data and storing the output window data in the third buffer comprises: obtaining the output window data and storing the output window data in the at least one output buffer sequentially; and
the storing, through the FIFO port, the output window data in the third buffer into the off-chip memory sequentially comprises: in response to output window data being stored in a first output buffer, reading output window data in the at least one output buffer sequentially, and storing the read output window data into the off-chip memory through the FIFO port.

4. The method according to claim 3, wherein the third buffer comprises two output buffers; and
during processing the task to be processed, storage of output window data and reading of output window data are performed on one of the two output buffers alternately, and reading of output window data and storage of output window data are performed on the other of the two output buffers alternately.

5. The method according to claim 1, wherein the first buffer comprises two input buffers; and
during processing the task to be processed, storage of the data to be processed and reading of the input window data to be processed are performed on one of the two input buffers alternately, and reading of the input window data to be processed and storage of the data to be processed are performed on the other of the two input buffers alternately.

6. The method according to claim 3, wherein a size of a convolution kernel corresponding to the convolution kernel data is r×r, a size of an input window corresponding to the input window data is n×n, and a sliding step of the input window corresponding to the input window data and a size of an output window corresponding to the input window data are m, wherein values of m, n, and r are respectively integers greater than 0 and n=m+r−1;
the input buffer is a line buffer; the first buffer is a cyclic buffer formed by n+m line buffers, and each of the line buffers is used for storing sequentially data in the same row in all channels of the task to be processed; and
the reading data to be processed of a preset size in a task to be processed from an off-chip memory of an accelerator and storing sequentially the data to be processed into at least one input buffer of a first buffer in an on-chip memory of the accelerator comprises:
reading the first n rows of data in all channels of the task to be processed from the off-chip memory for the first time, and storing correspondingly each row of data in the first n rows of data into the first n line buffers determined according to a predetermined cyclic direction in the first buffer; and
then reading m adjacent subsequent rows of data in all channels of the task to be processed from the off-chip memory each time, and storing correspondingly the m rows of data read this time into subsequent m adjacent line buffers determined according to the predetermined cyclic direction in the first buffer;

or, the reading data to be processed of a preset size in a task to be processed from an off-chip memory of an accelerator and storing sequentially the data to be processed into at least one input buffer of a first buffer in an on-chip memory of the accelerator comprises:
reading n rows of data in all channels of the task to be processed from the off-chip memory each time;
for the first n rows of data read from the task to be processed for the first time, storing correspondingly the first n rows of data into the first n line buffers determined according to a predetermined cyclic direction in the first buffer; and for n rows of data that are read not for the first time, taking n corresponding line buffers as target line buffers for the n rows of data read this time, wherein the n corresponding line buffers are obtained by sliding the first n line buffers, which store n rows of data read last time, by m rows according to the predetermined cyclic direction in the first buffer, and storing the n rows of data read this time into the target line buffers correspondingly.

7. The method according to claim 6, wherein the reading input window data to be processed from the at least one input buffer sequentially and performing convolution on the input window data to be processed by using the convolution kernel data comprises:
for the task to be processed, when the input window data to be processed is read for the first time, selecting the first n line buffers as a current computing buffer, reading input window data with a size of n×n from the current computing buffer sequentially according to the sliding step m, and performing convolution on the input window data to be processed by using the convolution kernel data until all data to be processed in the current computing buffer is read; and then selecting n line buffers as a new computing buffer via sliding from the previous computing buffer according to the sliding step m and the predetermined cyclic direction each time, and reading input window data with a size of n×n from the new computing buffer sequentially according to the sliding step m, and performing convolution on the input window data to be processed by using the convolution kernel data until all data to be processed in the new computing buffer is read.

8. The method according to claim 6, wherein the output buffer comprises m line buffers;

the obtaining the output window data and storing the output window data in the at least one output buffer sequentially comprises:

selecting one of the output buffers as a current output buffer, and storing sequentially output window data, obtained by performing convolution on each input window data, into the m line buffers of the current output buffer; and in response to storage of output window data, obtained by performing convolution on all input window data in one computing buffer, being completed, selecting another output buffer as the current output buffer, and performing the operation of storing sequentially output window data, obtained by performing convolution on each input window data, in the m line buffers of the current output buffer; and the storing the output window data in the third buffer into the off-chip memory sequentially comprises:

in response to storage of output window data, obtained by performing convolution on all input window data in the current computing buffer, being completed, storing the output window data in the current output buffer into the off-chip memory.

9. The method according to claim 3, wherein a size of a convolution kernel corresponding to the convolution kernel data is r×r, a size of an input window corresponding to the input window data is n×n, and a sliding step of the input window corresponding to the input window data is m, wherein the values of m, n, and r are respectively integers greater than 0 and n=m+r−1;

the input buffer is a column buffer; the first buffer is a cyclic buffer formed by n+m column buffers, and each column buffer is used for sequentially storing data in the same column in all channels of the task to be processed; and the reading data to be processed of a preset size in a task to be processed from an off-chip memory of an accelerator and storing sequentially the data to be processed into at least one input buffer of a first buffer in an on-chip memory of the accelerator comprises:

reading the first n columns of data in all channels of the task to be processed from the off-chip memory for the first time, and storing correspondingly each column of data in the first n columns of data into the first n column buffers determined according to a predetermined cyclic direction in the first buffer; and then reading m adjacent subsequent columns of data in all channels of the task to be processed from the off-chip memory each time, and storing correspondingly the m columns of data read this time into subsequent m adjacent column buffers determined according to the predetermined cyclic direction in the first buffer;

or, the reading data to be processed of a preset size in a task to be processed from an off-chip memory of an accelerator and storing sequentially the data to be processed into at least one input buffer of a first buffer in an on-chip memory of the accelerator comprises:

reading n columns of data in all channels of the task to be processed from the off-chip memory each time;

for the first n columns of data read from the task to be processed for the first time, storing correspondingly the first n columns of data into the first n column buffers determined according to a predetermined cyclic direction in the first buffer; and for n columns of data that are read not for the first time, taking n corresponding column buffers as target column buffers for the n columns of data read this time, wherein the n corresponding column buffers are obtained by sliding the first n column buffers, which store n columns of data read last time, by m columns according to the predetermined cyclic direction in the first buffer and storing the n columns of data read this time into the target column buffers correspondingly.

10. The method according to claim 9, wherein the reading input window data to be processed from the at least one input buffer sequentially and performing convolution on the input window data to be processed by using the convolution kernel data comprises:

for the task to be processed, when the input window data to be processed is read for the first time, selecting the first n column buffers as a current computing buffer, reading input window data with a size of n×n from the current computing buffer sequentially according to the sliding step m, and performing convolution on the input window data to be processed by using the convolution kernel data until all data to be processed in the current computing buffer is read; and then selecting n column buffers as a new computing buffer via sliding from the previous computing buffer according to the sliding step m and the predetermined cyclic direction each time, and reading input window data with a size of n×n from the new computing buffer sequentially according to the sliding step m, and performing convolution on the input window data to be processed by using the convolution kernel data until all data to be processed in the new computing buffer is read.

11. The method according to claim 9, wherein the output buffer comprises m column buffers;

the obtaining the output window data and storing the output window data in the at least one output buffer sequentially comprises:

selecting one of the output buffers as a current output buffer, and storing sequentially output window data, obtained by performing convolution on each piece of input window data, in the m column buffers of the current output buffer; and in response to storage of output window data, obtained by performing convolution on all input window data in one computing buffer, being completed, selecting another output buffer as a current output buffer, and performing the operation of storing sequentially output window data, obtained by performing convolution on each piece of input window data, in the m column buffers of the current output buffer; and the storing the output window data in the third buffer into the off-chip memory sequentially comprises:
in response to storage of output window data, obtained by performing convolution on all input window data in the current computing buffer, being completed, storing the output window data in the current output buffer into the off-chip memory.

12. The method according to claim 1, further comprising:
converting respectively convolution kernels corresponding to the at least one output channel through the corresponding first constant matrix in advance to obtain the at least one set of converted convolution kernels, and storing the converted convolution kernels in the second buffer; or
converting respectively convolution kernels corresponding to the at least one output channel through the corresponding first constant matrix to obtain the at least one set of converted convolution kernels.

13. The method according to claim 1, wherein the performing the following computing processing operations for any input channel respectively comprises: simultaneously performing the computing processing operations for Pm output channels and Pn input channels, wherein Pm and Pn are respectively integers greater than 0; and
the in response to obtaining convolution results of all input channels, accumulating corresponding points in the convolution results of all input channels to obtain output window data of one output channel comprises: for the Pm output channels, in response to obtaining convolution results of all input channels, accumulating respectively corresponding points in the convolution results of all input channels for one output channel to obtain output window data of the Pm output channels.

14. The method according to claim 13, wherein the value of Pm is 1, and the value of Pn is an integer greater than 1; and
the simultaneously performing the computing processing operations for Pm output channels and Pn input channels comprises: sequentially performing the computing processing operations in parallel for one output channel and all input channels, or one output channel and some input channels in all input channels.

15. The method according to claim 13, wherein the value of Pm is the number of all output channels, and the value of Pn is 1;
the simultaneously performing the computing processing operations for Pm output channels and Pn input channels comprises: for all output channels simultaneously, performing sequentially the computing processing operations for one input channel; and
the in response to obtaining convolution results of all input channels, accumulating corresponding points in the convolution results of all input channels to obtain output window data of one output channel comprises: for all output channels, in response to obtaining the convolution results of all input channels, separately accumulating corresponding points in the convolution results of all input channels for one output channel to obtain output window data of all output channels.

16. The method according to claim 13, further comprising:
obtaining, according to a parameter optimization model, optimal values of parameters in convolution based on a transmission bandwidth of the FIFO port and a resource condition of the accelerator, wherein the parameters in convolution comprise: a size of the input window, a degree of parallelism of the output channel, and a degree of parallelism of the input channel, and the optimal values of the parameters comprise: an optimal value n of the size of the input window, an optimal value Pm of the degree of parallelism of the output channel, and an optimal value Pn of the degree of parallelism of the input channel;
the simultaneously performing the computing processing operations for Pm output channels and Pn input channels comprises:
selecting Pm output channels and Pn input channels based on the values of Pm and Pn in the optimal values of the parameters, and performing the operation of simultaneously performing the computing processing operations for Pm output channels and Pn input channels.

17. The method according to claim 1, further comprising:
determining whether the size k×k of a convolution kernel of the current task to be processed is consistent with the size r×r of the convolution kernel corresponding to the accelerator; and
responsive to determining that the size k×k of the convolution kernel of the current task to be processed is not consistent with the size r×r of the convolution kernel corresponding to the accelerator, padding the convolution kernel of the current task to be processed with a columns of 0 on the right and b rows of 0 at the bottom, so that the convolution kernel of the current task to be processed is converted into a new convolution kernel with a size of tr×tr, wherein values of k, t, a, and b are respectively integers greater than 0.

18. A convolution accelerator, comprising:
a processor;
a memory for storing instructions executable by the processor;
a first buffer comprising at least one input buffer and configured to buffer the data to be processed;
a second buffer, configured to buffer at least one set of convolution kernel data; and
a third buffer, comprising at least one output buffer and configured to buffer the output window data;
wherein the processor is configured to:
read sequentially, through a First Input First Output (FIFO) port, data to be processed of a preset size in a task to be processed from an off-chip memory of the accelerator, and store the data to be processed into at least one input buffer of the first buffer;
read input window data to be processed from the at least one input buffer sequentially when data to be processed is stored into an input buffer, perform convolution on the input window data to be processed by using the convolution kernel data to obtain output window data and store the output window data in the third buffer; and
store the output window data in the third buffer into the off-chip memory sequentially through the FIFO port;
wherein the at least one set of convolution kernel data comprises at least one set of converted convolution kernels, wherein any set of converted convolution kernels is obtained by converting convolution kernels corresponding to one output channel through a corresponding first constant matrix; and
wherein the processor is further configured to:
perform the following computing processing operations for any input channel respectively:
converting the input window data to be processed through a corresponding second constant matrix to obtain converted input window data;

performing a matrix dot product operation on the converted input window data of the any input channel and the converted convolution kernels to obtain a matrix subjected to dot product;

converting the matrix subjected to dot product through a corresponding third constant matrix to obtain a convolution result; and in response to obtaining convolution results of all input channels, accumulating corresponding to one output channel, corresponding points in the convolution results of all input channels to obtain output window data of the output channel.

19. A non-transitory computer storage medium, for storing computer-readable instructions, wherein the instructions, when being executed by a processor, cause the processor to execute the following:

reading sequentially, through a First Input First Output (FIFO) port, data to be processed of a preset size in a task to be processed from an off-chip memory of an accelerator, and storing the data to be processed into at least one input buffer of a first buffer in an on-chip memory of the accelerator, wherein the on-chip memory comprises the first buffer, a second buffer and a third buffer, the first buffer comprises at least one input buffer, and at least one set of convolution kernel data is buffered in the second buffer;

in response to the data to be processed being stored into an input buffer, reading input window data to be processed from the at least one input buffer sequentially, performing convolution on the input window data to be processed by using the convolution kernel data to obtain output window data and storing the output window data in the third buffer; and storing, through the FIFO port, the output window data in the third buffer into the off-chip memory sequentially;

wherein the at least one set of convolution kernel data comprises at least one set of converted convolution kernels, wherein any set of converted convolution kernels is obtained by converting convolution kernels corresponding to one output channel through a corresponding first constant matrix; and wherein the performing convolution on the input window data to be processed by using the convolution kernel data to obtain output window data comprises:

performing the following computing processing operations for any input channel respectively:

converting the input window data to be processed through a corresponding second constant matrix to obtain converted input window data;

performing a matrix dot product operation on the converted input window data of the any input channel and the converted convolution kernels to obtain a matrix subjected to dot product;

converting the matrix subjected to dot product through a corresponding third constant matrix to obtain a convolution result; and in response to obtaining convolution results of all input channels, accumulating corresponding points in the convolution results of all input channels to obtain output window data of one output channel.

* * * * *